US008003169B2

(12) United States Patent
Misev et al.

(10) Patent No.: US 8,003,169 B2
(45) Date of Patent: Aug. 23, 2011

(54) CURING OF COATING INDUCED BY PLASMA

(75) Inventors: Ljubomir Misev, Breitenbach (CH); Andreas Valet, Binzen (DE); Peter Simmendinger, Basel (CH); Tunja Jung, Rheinfelden-Herten (DE)

(73) Assignee: BASF SE, Ludwigshafen (DE)

( * ) Notice: Subject to any disclaimer, the term of this patent is extended or adjusted under 35 U.S.C. 154(b) by 1152 days.

(21) Appl. No.: 10/511,578

(22) PCT Filed: Apr. 17, 2003

(86) PCT No.: PCT/EP03/04036

§ 371 (c)(1),
(2), (4) Date: Oct. 13, 2004

(87) PCT Pub. No.: WO03/089479

PCT Pub. Date: Oct. 30, 2003

(65) Prior Publication Data

US 2005/0129859 A1 Jun. 16, 2005

(30) Foreign Application Priority Data

Apr. 19, 2002 (EP) ..................................... 02008254

(51) Int. Cl.
*B05D 3/02* (2006.01)
*C08J 7/18* (2006.01)
*H05H 1/00* (2006.01)
*C08F 2/46* (2006.01)

(52) U.S. Cl. ......... 427/384; 427/487; 427/488; 427/535

(58) Field of Classification Search .................. 427/487, 427/488, 384, 535
See application file for complete search history.

(56) References Cited

U.S. PATENT DOCUMENTS 3,847,771 A * 11/1974 McGinniss ....................... 522/9
3,939,126 A * 2/1976 Carder et al. ................... 528/75
3,943,103 A * 3/1976 Borden et al. ................ 525/305
4,288,479 A 9/1981 Brack ............................. 428/40
4,427,823 A 1/1984 Inagaki et al.
4,885,077 A 12/1989 Karakelle et al. ............. 204/403
5,211,993 A 5/1993 Kolesinski .................... 427/488
5,322,737 A 6/1994 Morra et al.
5,439,545 A * 8/1995 Nakanishi et al. ......... 156/273.3
5,558,978 A * 9/1996 Schädeli et al. ........... 430/270.1
5,723,275 A 3/1998 Wang et al.
6,020,528 A 2/2000 Leppard et al. ................. 568/15
6,087,070 A 7/2000 Turner et al.
6,548,121 B1 4/2003 Bauer et al. ................... 427/509
2001/0034379 A1 10/2001 Valet
2001/0036591 A1 11/2001 Schulz et al.
2002/0076504 A1* 6/2002 Klinkenberg et al. ........ 427/508
2003/0129322 A1* 7/2003 Kunz et al. .................... 427/535

FOREIGN PATENT DOCUMENTS

| | | |
|---|---|---|
| DE | 19953433 | 5/2001 |
| EP | 0095974 | 12/1983 |
| GB | 1412211 | 10/1975 |
| GB | 1564541 | 4/1980 |
| JP | 96188663 | 7/1996 |
| JP | 96253733 | 10/1996 |
| WO | 93/25300 | 12/1993 |
| WO | 01/58971 | 8/2001 |

OTHER PUBLICATIONS

Epaillard et al. (Makromolekulare Chemie, 189(5) (1988), pp. 1035-1042).*
English Translation of the reference of (Epaillard et al. (Makromolekulare Chemie, 189(5) (1988), pp. 1035-1042).) (pp. 1-14).*
Derwent Abstr. 96-388647/39 (1996) for JP 08188663.
Derwent Abstr. 96-493570/49 (1996) for JP 08253733.
Derwent Abstr. 87-097790/14 (1987) for JP 62045634.
F. Hochart et al., Polymer, vol. 41, (2000), pp. 3159-3165.
Derwent Abstr. 83-840434/50 (1983) for EP 0095974.
Derwent Abstr. 2001-466392/51 (2001) for DE 19953433.
Foreign Office Action From India Dated Oct. 29, 2009.

* cited by examiner

*Primary Examiner* — Nadine G Norton
*Assistant Examiner* — Mahmoud Dahimene
(74) *Attorney, Agent, or Firm* — Qi Zhuo

(57) ABSTRACT

The Application relates to a method of curing various polymerisable compositions, comprising a suitable photoinitiator, the curing being effected by means of a plasma in plasma discharge chamber.

12 Claims, No Drawings

CURING OF COATING INDUCED BY PLASMA

The invention relates to a method of curing polymerisable compositions, especially surface coatings, by means of plasma.

JP 08253733-A describes coatings on conductive polymers, such as polypyrrole or polyaniline, which coatings promote the conduction of lithium ions. Such coatings in the form of thin films comprise compounds having ethoxy groups and free-radical-polymerisable double bonds, e.g. tris(2-methoxyethoxy)vinylsilane. The polymerisation of the films is effected in a plasma. U.S. Pat. No. 5,211,993 discloses the preparation of a chromatographically active material by coating of a substrate with a monomer and polymerisation by means of the action of plasma, layer thicknesses of 10 Å (1 nm) being applied. U.S. Pat. No. 4,885,077 discloses the preparation of ion-permeable hydrophilic membranes, the polymerisation of a monomer (acrylic acid) applied to a porous membrane being effected by noble gas plasma treatment. JP 2045634-A describes a method of improving the adhesiveness of polyolefin moulds by the application of an unsaturated epoxy compound and treatment with plasma. US 2003/0003407 describes a process wherein a photoresist is treated with a neon-containing plasma. U.S. Pat. No. 3,943,103 and U.S. Pat. No. 3,939,126 disclose the curing of planar coatings by means of argon arc lamps. EP 095 974 describes the curing of coatings on planar substrates. The polymerisation and copolymerisation of fluorinated acylates on glass plates is described in Polymer 41 (2000), 3159-3165.

JP 08188663-A describes the corona treatment of a substrate, subsequent application of a monomer in order to obtain water-repellent properties and subsequent plasma treatment with helium and a fluorine-containing gas, so that a fluorine-containing coating is created on the substrate. In none of the methods described above are photoinitiators used or coatings having high layer thicknesses produced.

WO 00/24527 describes the plasma treatment of a substrate to be coated, subsequent grafting-on of an ethylenically unsaturated photoinitiator, and subsequent coating with a conventional UV-curable composition and curing thereof by means of irradiation with UV light. A similar process is known from WO 01/58971, the ethylenically unsaturated photoinitiator to be grafted on being replaced in that case by an ethylenically unsaturated electron-donor or H-donor.

There is a need in the art, especially in the field of coatings and paints, for efficient curing methods for polymerisable compositions, especially coatings on complex, predominantly metallic substrates, the geometry of which has undercuts and overshadowed areas. It has now been found that the curing of such formulations, especially of surface coatings, by plasma treatment brings advantages.

The invention therefore relates to a method of curing a composition comprising (a) at least one free-radical-polymerisable compound or (b) at least one compound that, under the action of an acid, is able to enter into a polymerisation, polycondensation or polyaddition reaction, or (c) at least one compound that, under the action of a base, is able to enter into a polymerisation, polycondensation or polyaddition reaction, or a mixture of components (a) and (b), or a mixture of components (a) and (c); and (d) at least one photolatent compound that is activatable by plasma discharge;

wherein the composition is applied to a three-dimensional substrate and the curing is carried out in a plasma discharge chamber.

The invention relates also to a method of curing a composition comprising (a) at least one free-radical-polymerisable compound or (b) at least one compound that, under the action of an acid, is able to enter into a polymerisation, polycondensation or polyaddition reaction, or (c) at least one compound that, under the action of a base, is able to enter into a polymerisation, polycondensation or polyaddition reaction, or a mixture of components (a) and (b), or a mixture of components (a) and (c); and (d) at least one photolatent compound that is activatable by plasma discharge; and (e) at least one light stabiliser compound or UV absorber compound;

wherein the curing is carried out in a plasma discharge chamber.

The unsaturated compounds may contain one or more olefinic double bonds. They may be low molecular weight (monomeric) or higher molecular weight (oligomeric). Examples of monomers having a double bond are alkyl and hydroxyalkyl acrylates and methacrylates, e.g. methyl, ethyl, butyl, 2-ethylhexyl and 2-hydroxyethyl acrylate, isobornyl acrylate and methyl and ethyl methacrylate. Also of interest are resins modified with silicon or fluorine, e.g. silicone acrylates. Further examples are acrylonitrile, acrylamide, methacrylamide, N-substituted (meth)acrylamides, vinyl esters, such as vinyl acetate, vinyl ethers, such as iso-butyl vinyl ether, styrene, alkyl- and halo-styrenes, N-vinylpyrrolidone, vinyl chloride and vinylidene chloride.

Examples of monomers having a plurality of double bonds are ethylene glycol diacrylate, propylene glycol diacrylate, neopentyl glycol diacrylate, hexamethylene glycol diacrylate and bisphenol A diacrylate, 4,4'-bis(2-acryloyloxyethoxy) diphenylpropane, trimethylolpropane tri-acrylate, pentaerythritol triacrylate and pentaerythritol tetraacrylate, vinyl acrylate, divinyl-benzene, divinyl succinate, diallyl phthalate, triallyl phosphate, triallyl isocyanurate and tris(2-acryloylethyl)isocyanurate.

Examples of higher molecular weight (oligomeric) polyunsaturated compounds are acrylated epoxy resins, acrylated or vinyl-ether- or epoxy-group-containing polyesters, polyurethanes and polyethers. Further examples of unsaturated oligomers are unsaturated polyester resins, which are usually produced from maleic acid, phthalic acid and one or more diols and have molecular weights of about from 500 to 3000. In addition it is also possible to use vinyl ether monomers and oligomers, and also maleate-terminated oligomers having polyester, polyurethane, polyether, polyvinyl ether and epoxide main chains. Combinations of vinyl-ether-group-carrying oligomers and polymers, as described in WO 90/01512, are especially suitable, but copolymers of monomers functionalised with maleic acid and vinyl ether also come into consideration. Such unsaturated oligomers can also be termed prepolymers.

Especially suitable are, for example, esters of ethylenically unsaturated carboxylic acids and polyols or polyepoxides, and polymers having ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, and also mixtures of one or more such polymers.

Examples of unsaturated carboxylic acids are acrylic acid, methacrylic acid, crotonic acid, itaconic acid, cinnamic acid and unsaturated fatty acids, such as linolenic acid and oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or fully esterified by one or by different unsaturated carboxylic acid(s), it being possible for the free hydroxyl groups in partial esters to be modified, for example etherified, or esterified by other carboxylic acids.

Examples of esters are:

trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

Also suitable as component (a) are the amides of identical or different unsaturated carboxylic acids and aromatic, cycloaliphatic and aliphatic polyamines having preferably from 2 to 6, especially from 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine and di(β-aminoethoxy)- and di(β-aminopropoxy)-ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis(methacrylamidopropoxy) ethane, β-methacrylamidoethyl methacrylate and N-[(β-hydroxyethoxy)ethyl]-acrylamide.

Suitable unsaturated polyesters and polyamides are derived, for example, from maleic acid and diols or diamines. The maleic acid may have been partially replaced by other dicarboxylic acids. They may be used together with ethylenically unsaturated comonomers, e.g. styrene. The polyesters and polyamides may also be derived from dicarboxylic acids and ethylenically unsaturated diols or diamines, especially from those having longer chains of e.g. from 6 to 20 carbon atoms. Examples of polyurethanes are those composed of saturated diisocyanates and unsaturated diols or unsaturated diisocyanates and saturated diols.

Polybutadiene and polyisoprene and copolymers thereof are known. Suitable comonomers include, for example, olefins, such as ethylene, propene, butene and hexene, (meth) acrylates, acrylonitrile, styrene and vinyl chloride. Polymers having (meth)acrylate groups in the side chain are likewise known. Examples are reaction products of novolak-based epoxy resins with (meth)acrylic acid; homo- or co-polymers of vinyl alcohol or hydroxyalkyl derivatives thereof that have been esterified with (meth)acrylic acid; and homo- and co-polymers of (meth)acrylates that have been esterified with hydroxyalkyl(meth)acrylates. (The term "(meth)acrylate" in the context of this Application denotes both "acrylate" and "meth-acrylate").

Suitable components (a) are also acrylates that have been modified by reaction with primary or secondary amines, as described e.g. in U.S. Pat. No. 3,844,916, in EP 280 222, in U.S. Pat. No. 5,482,649 or in U.S. Pat. No. 5,734,002. Such amine-modified acrylates are also known as aminoacrylates. Amino-acrylates are obtainable e.g. from UCB Chemicals under the name ®EBECRYL 80, ®EBECRYL 81, ®EBECRYL 83, ®EBECRYL 7100, from BASF under the name ®Laromer PO83F, ®Laromer PO 84F, ®Laromer PO 94F, from Cognis under the name ®PHOTOMER 4775 F, ®PHOTOMER 4967 F or from Cray Valley under the name ®CN501, ®CN503, ®CN550.

The photopolymerisable compounds can be used on their own or in any desired mixtures. Preferably mixtures of polyol (meth)acrylates are used.

Binders may also be added to the compositions according to the invention, this being particularly advantageous when the photopolymerisable compounds are liquid or viscous substances. The amount of binder may be, for example, from 5 to 95% by weight, preferably from 10 to 90% by weight and especially from 40 to 90% by weight, based on total solids. The choice of binder is made in accordance with the field of use and the properties required therefor, such as developability in aqueous and organic solvent systems, adhesion to substrates and sensitivity to oxygen.

Suitable binders are, for example, polymers having a molecular weight of approximately from 5000 to 2 000 000, preferably from 1000 to 1 000 000. Examples are: homo- and co-polymers of acrylates and methacrylates, e.g. copolymers of methyl methacrylate/ethyl acrylate/methacrylic acid, poly (methacrylic acid alkyl esters), poly(acrylic acid alkyl esters); cellulose esters and ethers, such as cellulose acetate, cellulose acetate butyrate, methylcellulose, ethylcellulose; polyvinylbutyral, polyvinylformal, cyclised rubber, polyethers such as polyethylene oxide, polypropylene oxide, polytetrahydrofuran; polystyrene, polycarbonate, polyurethane, chlorinated polyolefins, polyvinyl chloride, copolymers of vinyl chloride/-vinylidene chloride, copolymers of vinylidene chloride with acrylonitrile, methyl methacrylate and vinyl acetate, polyvinyl acetate, copoly(ethylene/vinyl acetate), polymers such as poly-caprolactam and poly(hexamethylene adipamide), polyesters such as poly(ethylene glycol terephthalate) and poly(hexamethylene glycol succinate).

The unsaturated compounds can also be used in admixture with non-photopolymerisable film-forming components. These may be, for example, physically drying polymers or solutions thereof in organic solvents, for example nitrocellulose or cellulose acetobutyrate, but they may also be chemically or thermally curable resins, for example polyisocyanates, polyepoxides or melamine resins, for example two-component systems of a (poly)alcohol and/or (poly)thiol and a (poly)isocyanate. The concomitant use of thermally curable resins is important for use in so-called hybrid systems, which are photopolymerised in a first step and crosslinked by thermal after-treatment in a second step. In said systems curing can also be effected by a first thermal step and subsequent UV-irradiation, as well as simultaneous thermal treatment and irradiation.

As component (a) there also come into consideration, for example, ethylenically unsaturated photopolymerisable compounds emulsified or dissolved in water. Examples of such systems can be found in EP 12 339, EP 41 125 and DE 2 936 039.

The compositions according to the invention comprise as component (b) e.g. resins and compounds that can be polymerised cationically by alkyl- or aryl-containing cations or by protons. Examples thereof are cyclic ethers, especially epoxides and oxetanes, and also vinyl ethers and hydroxyl-containing compounds. Lactone compounds and cyclic thioethers and also vinyl thioethers can also be used. Further examples are aminoplasts or phenolic resol resins. They are especially melamine, urea, epoxy, phenol, acrylic, polyester and alkyd resins, but more especially mixtures of acrylic, polyester or alkyd resins with a melamine resin. Also included are modified surface-coating resins, e.g. acrylic-modified polyester and alkyd resins. Examples of individual types of resins that are included under the terms acrylic, polyester and alkyd resins are described, for example, in Wagner, Sarx/Lackkunstharze (Munich, 1971), pages 86 to 123 and 229 to 238, or in Ullmann/Encyclopädie der techn. Chemie, 4th edition, Vol. 15 (1978), pages 613 to 628, or Ullmann's Encyclopedia of Industrial Chemistry, Verlag Chemie, 1991, Vol. 18, 360 ff., Vol. A19, 371 ff. The component preferably contains an amino resin (especially when the composition is used as a surface coating). Examples thereof are etherified or non-etherified melamine, urea, guanidine or biuret resins. Acid catalysis is especially important for the curing of surface coatings that contain etherified amino resins, e.g. methylated or butylated melamine resins (N-methoxymethyl- or N-butoxymethyl-melamine) or methylated/butylated glycol urils.

It is also possible, for example, to use all customary epoxides, such as aromatic, aliphatic or cycloaliphatic epoxy resins. They are compounds having at least one epoxy group, preferably at least two epoxy groups, in the molecule. Examples thereof are the glycidyl ethers and β-methylglycidyl ethers of aliphatic or cycloaliphatic diols or polyols, e.g. those of ethylene glycol, propane-1,2-diol, propane-1,3-diol, butane-1,4-diol, diethylene glycol, polyethylene glycol, polypropylene glycol, glycerol, trimethylolpropane or 1,4-dimethylolcyclohexane or of 2,2-bis(4-hydroxycyclohexyl) propane and N,N-bis(2-hydroxyethyl)aniline; the glycidyl ethers of di- and poly-phenols, for example of resorcinol, of 4,4'-dihydroxyphenyl-2,2-propane, of novolaks or of 1,1,2,2-tetrakis(4-hydroxyphenyl)ethane. Examples are phenyl glycidyl ether, p-tert-butyl glycidyl ether, o-cresyl glycidyl ether, polytetrahydrofuran glycidyl ethers, n-butyl glycidyl ether, 2-ethylhexyl glycidyl ether, $C_{12/15}$alkyl glycidyl ethers, cyclohexanedimethanol diglycidyl ethers. Further examples are N-glycidyl compounds, e.g. the glycidyl compounds of ethyleneurea, 1,3-propyleneurea or 5-dimethylhydantoin or of 4,4'-methylene-5,5'-tetramethyidihydantoin, or compounds such as triglycidyl isocyanurate.

Further examples of glycidyl ether components (b) used in the method according to the invention are glycidyl ethers of monovalent phenols obtained by reaction of polyvalent phenols with an excess of chlorohydrin, for example epichlorohydrin (e.g. glycidyl ethers of 2,2-bis(2,3-epoxypropoxyphenol)propane. Further examples of glycidyl ether epoxides that can be used in the context of the present invention are described e.g. in U.S. Pat. No. 3,018,262 and in "Handbook of Epoxy Resins" by Lee and Neville, McGraw-Hill Book Co., New York (1967).

A large number of commercially available glycidyl ether epoxides are suitable as component (b), for example glycidyl methacrylate, diglycidyl ethers of bisphenol A, e.g. those available under the trade names EPON 828, EPON 825, EPON 1004 and EPON 1010 from Shell; DER-331, DER-332 and DER-334 from Dow Chemical; 1,4-butanediol diglycidyl ether of phenolformaldehyde novolak, e.g. DEN-431, DEN-438 from Dow Chemical; and resorcinol diglycidyl ether; alkyl glycidyl ethers, for example $C_8$-$C_{10}$glycidyl ethers, e.g. HELOXY Modifier 7, $C_{12}$-$C_{14}$glycidyl ethers, e.g. HELOXY Modifier 8, butyl glycidyl ether, e.g. HELOXY Modifier 61, cresyl glycidyl ether, e.g. HELOXY Modifier 62, p-tert-butylphenyl glycidyl ether, e.g. HELOXY Modifier 65, polyfunctional glycidyl ethers, for example diglycidyl ether of 1,4-butanediol, e.g. HELOXY Modifier 67, diglycidyl ether of neopentyl glycol, e.g. HELOXY Modifier 68, diglycidyl ether of cyclohexanedimethanol, e.g. HELOXY Modifier 107, trimethylolethane triglycidyl ether, e.g. HELOXY Modifier 44, trimethylol-propanetriglycidyl ether, e.g. HELOXY Modifer 48, polyglycidyl ethers of aliphatic polyols, e.g. HELOXY Modifier 84 (all HELOXY glycidyl ethers are available from Shell).

Also suitable are glycidyl ethers that contain copolymers of acrylic esters, e.g. styrene/glycidyl methacrylate or methyl methacrylate/glycidyl acrylate. Examples are 1:1 styrene/glycidyl methacrylate, 1:1 methyl methacrylate/glycidyl acrylate, 62.5:24:13.5 methyl methacrylate/ethyl acrylate/glycidyl methacrylate.

The polymers of the glycidyl ether compounds may, for example, also contain other functionalities, provided that they do not impair the cationic curing.

Other glycidyl ether compounds suitable as component (b) and commercially available from Vantico are polyfunctional liquid and solid novolak glycidyl ether resins, e.g. PY 307, EPN 1179, EPN 1180, EPN 1182 and ECN 9699.

It will be understood that it is also possible to use as component (b) mixtures of different glycidyl ether compounds.

Glycidyl ethers suitable for component (b) are, for example, compounds of formula XX (XX)

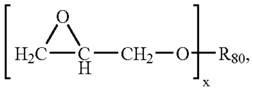

wherein x is a number from 1 to 6; and $R_{80}$ is a monovalent to hexavalent alkyl or aryl radical.

Preference is given, for example, to glycidyl ether compounds of formula XX wherein x is a number 1, 2 or 3; and $R_{80}$, when x=1, is unsubstituted or $C_1$-$C_{12}$alkyl-substituted phenyl, naphthyl, anthracyl, biphenylyl, $C_1$-$C_{20}$alkyl, or $C_2$-$C_{20}$alkyl interrupted by one or more oxygen atoms, or $R_{80}$, when x=2, is 1,3-phenylene, 1,4-phenylene, $C_6$-$C_{10}$cycloalkylene, unsubstituted or halo-substituted $C_1$-$C_{40}$alkylene, $C_2$-$C_{40}$alkylene interrupted by one or more oxygen atoms, or a group

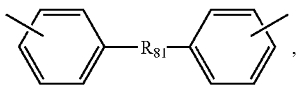

, or or $R_{80}$, when x=3, is a radical

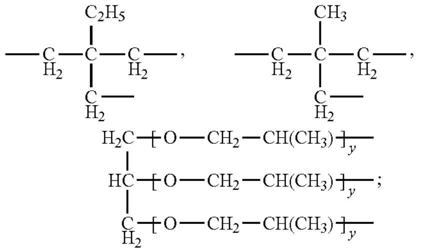

or y is a number from 1 to 10; and $R_{81}$ is $C_1$-$C_{20}$alkylene, oxygen or

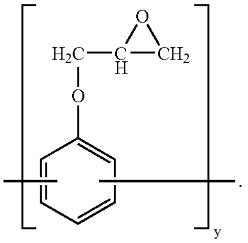

The glycidyl ethers are e.g. compounds of formula XXa (XXa)

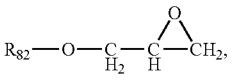

wherein wherein $R_{82}$ is unsubstituted or $C_1$-$C_{12}$alkyl-substituted phenyl; naphthyl; anthracyl; biphenylyl; $C_1$-$C_{20}$alkyl, $C_2$-$C_{20}$alkyl interrupted by one or more oxygen atoms; or a group of the formula

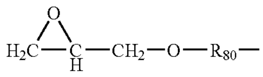

;

$R_{80}$ is phenylene, $C_1$-$C_{20}$alkylene, $C_2$-$C_{20}$alkylene interrupted by one or more oxygen atoms, or a group

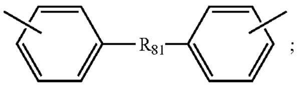

; and $R_{81}$ is $C_1$-$C_{20}$alkylene or oxygen.

Preference is given to the glycidyl ether compounds of formula XXb (XXb)

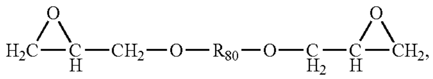

wherein $R_{80}$ is phenylene, $C_1$-$C_{20}$alkylene, $C_2$-$C_{20}$alkylene interrupted by one or more oxygen atoms, or a group

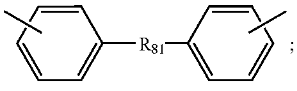

; and $R_{81}$ is $C_1$-$C_{20}$alkylene or oxygen.

Further examples of component (b) are polyglycidyl ethers and poly(β-methylglycidyl) ethers obtainable by reaction of a compound containing at least two free alcoholic and/or phenolic hydroxyl groups per molecule with the corresponding epichlorohydrin under alkaline conditions, or alternatively in the presence of an acid catalyst with subsequent alkali treatment, it also being possible to use mixtures of different polyols.

Such ethers can be prepared with poly(epichlorohydrin) from acyclic alcohols, such as ethylene glycol, diethylene glycol and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis(4-hydroxycyclohexyl)methane, 2,2-bis(4-hydroxycyclohexyl) propane and 1,1-bis-(hydroxymethyl)cyclohex-3-ene, and from alcohols having aromatic nuclei, such as N,N-bis(2-hydroxyethyl)aniline and p,p'-bis(2-hydroxyethylamino) diphenylmethane. They can also be prepared from mononuclear phenols, such as resorcinol and hydroquinone, and from polynuclear phenols, such as bis(4-hydroxyphenyl) methane, 4,4-dihydroxydiphenyl, bis(4-hydroxyphenyl)sulfone, 1,1,2,2-tetrakis(4-hydroxyphenyl)ethane, 2,2-bis(4-hydroxyphenyl)-propane (bisphenol A) and 2,2-bis(3,5-dibromo-4-hydroxyphenyl)propane.

Further hydroxy compounds suitable for the preparation of polyglycidyl ethers and poly-(β-methylglycidyl) ethers are the novolaks obtainable by condensation of aldehydes, such as formaldehyde, acetaldehyde, chloral and furfural, and phenols, for example phenol, o-cresol, m-cresol, p-cresol, 3,5-dimethylphenol, 4-chlorophenol and 4-tert-butylphenol.

Poly(N-glycidyl) compounds can be obtained, for example, by dehydrochlorination of the reaction products of epichlorohydrin with amines containing at least two amine hydrogen atoms, such as aniline, n-butylamine, bis(4-aminophenyl)methane, bis(4-aminophenyl)-propane, bis(4-methylaminophenyl)methane and bis(4-aminophenyl) ether, sulfone and sulfoxide. Further suitable poly(N-glycidyl) compounds are triglycidyl isocyanurate and N,N'-diglycidyl derivatives of cyclic alkyleneureas, such as ethyleneurea and 1,3-propyleneurea, and hydantoins, such as 5,5-dimethylhydantoin.

Poly(S-glycidyl) compounds are also suitable. Examples thereof are the di-S-glycidyl derivatives of dithiols, such as ethane-1,2-dithiol and bis(4-mercaptomethylphenyl) ether.

Also coming into consideration as component (b) are epoxy resins wherein the glycidyl groups or β-methylglycidyl groups are bonded to different kinds of hetero atoms, for example the N,N,O-triglycidyl derivative of 4-aminophenol, the glycidyl ether glycidyl ester of salicylic acid or p-hydroxybenzoic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Diglycidyl ethers of bisphenols are preferred. Examples thereof are bisphenol A diglycidyl ether, e.g. ARALDIT GY 250 from Vantico, bisphenol F diglycidyl ether and bisphenol S diglycidyl ether. Special preference is given to bisphenol A diglycidyl ether.

Further glycidyl compounds of technical importance and suitable for use in component (b) are the glycidyl esters of carboxylic acids, especially di- and poly-carboxylic acids. Examples thereof are the glycidyl esters of succinic acid, adipic acid, azelaic acid, sebacic acid, phthalic acid, terephthalic acid, tetra- and hexa-hydrophthalic acid, isophthalic acid or trimellitic acid, or of dimerised fatty acids.

Examples of polyepoxides that are not glycidyl compounds are the epoxides of vinylcyclohexane and dicyclopentadiene, 3-(3',4'-epoxycyclohexyl)-8,9-epoxy-2,4dioxaspiro [5.5]-undecane, the 3',4'-epoxycyclohexylmethyl ester of 3,4-epoxycyclohexanecarboxylic acid, (3,4-epoxycyclohexyl-methyl-3,4-epoxycyclohexanecarboxylate), butadiene diepoxide or isoprene diepoxide, epoxidised linoleic acid derivatives and epoxidised polybutadiene.

Further suitable epoxy compounds are e.g. limonene monoxide, epoxidised soybean oil, bisphenol A and bisphenol F epoxy resins, e.g. Araldit® GY 250 (A), Araldit® GY 282 (F), Araldit® GY 285 (F) (Vantico), and also photocrosslinkable siloxanes that contain epoxy groups.

Further suitable cationically polymerisable or crosslinkable components (b) can be found e.g. in U.S. Pat. Nos. 3,117,099, 4,299,938 and 4,339,567.

From the group of aliphatic epoxides there are suitable e.g. especially the monofunctional α-olefin epoxides having an unbranched chain consisting of 10, 12, 14 or 16 carbon atoms.

Because a large number of different epoxy compounds are commercially available nowadays, the properties of the binder can vary widely. One possible variation, for example depending upon the intended use of the composition, is the use of mixtures of different epoxy compounds and the addition of flexibilisers and reactive diluents.

The epoxy resins can be diluted with a solvent to facilitate application, for example when application is effected by spraying, but it is preferable to use the epoxy compound in the solventless state. Resins that are viscous to solid at room temperature can be applied, for example, in the hot state.

Also suitable as component (b) are all customary vinyl ethers, such as aromatic, aliphatic or cycloaliphatic vinyl ethers and also silicon-containing vinyl ethers. They are compounds having at least one vinyl ether group, preferably at least two vinyl ether groups, in the molecule. Examples of vinyl ethers that are suitable for use in the method according to the invention are triethylene glycol divinyl ether, 1,4-cyclohexanedimethanol divinyl ether, 4-hydroxybutyl vinyl ether, the propenyl ether of propylene carbonate, dodecylvinyl ether, tert-butyl vinyl ether, tert-amyl vinyl ether, cyclohexyl vinyl ether, 2-ethylhexyl vinyl ether, ethylene glycol monovinyl ether, butanediol monovinyl ether, hexanediol monovinyl ether, 1,4-cyclohexanedimethanol monovinyl ether, diethylene glycol monovinyl ether, ethylene glycol divinyl ether, ethylene glycol butylvinyl ether, butanediol-1,4-divinyl ether, hexanediol divinyl ether, diethylene glycol divinyl ether, triethylene glycol divinyl ether, triethylene glycol methylvinyl ether, tetraethylene glycol divinyl ether, Pluriol-E-200 divinyl ether, polytetrahydrofuran divinyl ether 290, trimethylolpropane trivinyl ether, dipropylene glycol divinyl ether, octadecylvinyl ether, (4-cyclohexyl-methyleneoxyethene)glutaric acid methyl ester and (4-butyloxyethene)isophthalic acid ester.

Examples of hydroxyl-containing compounds are polyester polyols, e.g. polycaprolactones or polyester adipate polyols, glycols and polyether polyols, castor oil, hydroxy-functional vinyl and acrylic resins, cellulose esters, e.g. cellulose acetate butyrate, and phenoxy resins.

Further suitable cationically curable formulations can be found e.g. in EP 119 425.

Preferred as component (b) are cycloaliphatic epoxides, or epoxides based on bisphenol A.

The base-catalysed polymerisation, addition, condensation or substituion reaction can be carried out with low molecular weight compounds (monomers), with oligomers, with polymeric compounds or with a mixture of such compounds. Examples of reactions that can be carried out either with monomers or with oligomers/polymers using the method according to the invention are the Knoevenagel reaction or Michael addition. The presence of further components may be advantageous or necessary for the reaction. This is disclosed, for example, in EP 1 092 757.

Of special importance are compositions wherein component (c) is an anionically polymerisaable or crosslinkable organic material.

The anionically polymerisable or crosslinkable organic material [component (c)] can be in the form of mono- or poly-functional monomers, oligomers or polymers.

Especially preferred oligomeric/polymeric systems (c) are binders customary in the coating industry.

Two-component systems of an α,β-ethylenically unsaturated carbonyl compound and a polymer containing activated $CH_2$ groups, the activated $CH_2$ groups being present either in the main chain or in the side chain or in both, as described, for example, in EP 161 697 for (poly)malonate groups. The malonate group can in a polyurethane, polyester, polyacrylate, epoxy resin, polyamide or polyvinyl polymer be bonded either in the main chain or in a side chain. The α,β-ethylenically unsaturated carbonyl compound used may be any double bond activated by a carbonyl group. Examples are esters or amides of acrylic acid or methacrylic acid. Additional hydroxyl groups may also be present in the ester groups. Di- and tri-esters are also possible. Typical examples are hexanediol diacrylate and trimethylolpropane tri-acrylate. Instead of acrylic acid it is also possible to use other acids and esters or amides thereof, for example crotonic acid or cinnamic acid.

Other compounds having activated $CH_2$ groups are (poly) acetoacetates and (poly)cyanoacetates.

Further examples are two-component systems of a polymer containing activated $CH_2$ groups, the activated $CH_2$ groups being present either in the main chain or in the side chain or in both, or a polymer containing activated $CH_2$ groups, such as (poly)acetoacetates and (poly)cyanoacetates, and a polyaldehyde crosslinking agent, for example terephthalic aldehyde. Such systems are described, for example, in Urankar et al., Polym. Prepr. (1994), 35, 933.

The components of the system react with one another, with base catalysis, at room temperature and form a crosslinked coating system suitable for many applications. By virtue of its already good resistance to weathering, the system is also suitable, for example, for outdoor applications and can, if necessary, be additionally stabilised by UV absorbers and other light stabilisers.

Also coming into consideration as component (c) in the compositions according to the invention are epoxy systems. Epoxy resins suitable for the preparation of curable mixtures according to the invention having epoxy resins as component (c) are those customary in epoxy resin technology. Examples of such epoxy resins are described above under component (b).

Suitable examples are especially polyglycidyl and poly(β-methylglycidyl) esters, obtainable by reaction of a compound having at least two carboxyl groups in the molecule and epichlorohydrin and β-methylepichlorohydrin, respectively. The reaction is advantageously carried out in the presence of bases.

An aliphatic polycarboxylic acid may be used as the compound having at least two carboxyl groups in the molecule. Examples of such polycarboxylic acids are oxalic acid, succinic acid, glutaric acid, adipic acid, pimelic acid, suberic acid, azelaic acid and dimerised or trimerised linoleic acid. It is also possible, however, to use cycloaliphatic polycarboxylic acids, for example tetrahydrophthalic acid, 4-methyltetrahydrophthalic acid, hexahydrophthalic acid or 4-methylhexahydrophthalic acid. Aromatic polycarboxylic acids, for example phthalic acid, isophthalic acid or terephthalic acid, may also be used.

Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, such as ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, propane, pentaerythritol, sorbitol, and also from polyepichlorohydrins. They may also, however, be derived e.g. from cycloaliphatic alcohols, such as 1,4-cyclohexanedimethanol, bis(4-hydroxycyclohexyl)methane or 2,2-bis(4-hydroxycyclohexyl)propane, or they have aromatic nuclei, such as N,N-bis(2-hydroxyethyl)aniline or p,p'-bis(2-hydroxyethylamino)-diphenylmethane. The glycidyl ethers can also be derived from mononuclear phenols, for example resorcinol or hydroquinone, or they are based on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, and on novolaks, obtainable by condensation of aldehydes, such as formaldehyde, acetaldehyde, chloral or furfuraldehyde, with phenols, such as phenol, or with phenols that are substituted in the nucleus by chlorine atoms or by $C_1$-$C_9$alkyl groups, e.g. 4-cholorphenol, 2-methylphenol or 4-tert-butylphenol, or by condensation with bisphenols, such as those of the above-mentioned kind.

Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-di-glycidyl derivatives of cycloalkyleneureas, such as ethyleneurea or 1,3-propyleneurea, and diglycidyl derivatives of hydantoins, such as of 5,5-dimethylhydantoin.

Poly(S-glycidyl) compounds, for example di-S-glycidyl derivatives, derived from dithiols, e.g. ethane-1,2-dithiol or bis(4-mercaptomethylphenyl) ether.

Cycloaliphatic epoxy resins, for example bis(2,3-epoxycyclopentyl) ether, 2,3-epoxycyclopentylglycidyl ether, 1,2-bis(2,3-epoxycyclopentyloxy)ethane or 3,4-epoxycyclohexylmethyl-3',4'-epoxycyclohexanecarboxylate.

It is also possible, however, to use epoxy resins wherein the 1,2-epoxy groups are bonded to different hetero atoms or functional groups; such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

It is also possible to use mixtures of epoxy resins as component (c). The invention therefore also relates to compositions comprising an epoxy resin or a mixture of different epoxy resins as component (c).

Component (c) may also comprise compounds that are converted into a different form by the action of bases. They are, for example, compounds that, when base-catalysed, e.g. by removal of protecting groups, change their solubility in suitable solvents.

As will be seen from the above description, some monomers, oligomers and polymers are suitable as component (a), (b) or (c), because they are both free-radical-crosslinkable and acid- or base-crosslinkable. For example, the two-component systems (2K systems) described above as base-catalysed curable components can also be crosslinked by the addition of a free-radical-forming photoinitiator.

The invention relates to a method as described above wherein the composition comprises as polymerisable component solely free-radical-polymerisable compounds (a).

In addition, the invention relates to a method wherein the free-radical-polymerisable compound comprises at least one mono-, di-, tri- or tetra-functional acrylate monomer and/or at least one mono-, di-, tri- or tetra-functional acrylate-functional oligomer.

Another method according to the invention is a method wherein the composition comprises as polymerisable component solely cationically polymerisable or crosslinkable compounds (b).

The invention relates also to a method wherein the composition comprises as polymerisable component a mixture of at least one free-radical-polymerisable compound (a) and at least one cationically polymerisable compound (b).

The two components (a) and (b) may be discrete compounds, but the reactive groups necessary for the free-radical or cationic polymerisation can also be located in the same molecule. The invention therefore relates also to a method wherein there are used, as components (a) and (b) combined, compounds that contain both a free-radical-polymerisable group and a cationically polymerisable group in one molecule. Examples of such compounds are acrylated epoxides or, for example, combinations of hydroxy-functionalised acrylates and isocyanate-functionalised acrylates.

Examples of photolatent compounds (d) that are activatable by plasma discharge are photoinitiators such as free-radical photoinitiators, photolatent acids and photolatent bases.

Examples of free-radical-forming photolatent compounds are camphorquinone, benzophenone and derivatives thereof, acetophenone, and also acetophenone derivatives, for example α-hydroxyacetophenones, e.g. α-hydroxycycloalkylphenyl ketones, especially (1-hydroxycyclohexyl)-phenyl ketone, or 2-hydroxy-2-methyl-1-phenyl-propanone; dialkoxyacetophenones, e.g. 2,2-dimethoxy-1,2-diphenylethan-1-one; or α-aminoacetophenones, e.g. (4-methylthiobenzoyl)-1-methyl-1-morpholino-ethane, (4-morpholinobenzoyl)-1-benzyl-1-dimethylamino-propane; 4-aroyl-1,3-dioxolanes; benzoin alkyl ethers and benzil ketals, e.g. benzil dimethyl ketal; phenyl glyoxalates and derivatives thereof, e.g. dimeric phenyl-glyoxalates, siloxane-modified phenyl glyoxalates; peresters, e.g. benzophenonetetracarboxylic acid peresters, as described, for example, in EP 126 541; monoacylphosphine oxides, e.g. (2,4,6-trimethylbenzoyl)-phenyl-phosphine oxide; bisacylphosphine oxides, e.g. bis(2,6-dimethoxybenzoyl)-(2,4,4-trimethyl-pent-1-yl)phosphine oxide, bis(2,4,6-trimethyl-benzoyl)-phenyl-phosphine oxide or bis(2,4,6-trimethylbenzoyl)-(2,4-dipentyloxyphenyl)-phosphine oxide; trisacylphosphine oxides; halomethyltriazines, e.g. 2-[2-(4-methoxy-phenyl)-vinyl]-4,6-bis-trichloromethyl-[1,3,5]triazine, 2-(4-methoxy-phenyl)-4,6-bis-trichloro-methyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine, hexaarylbisimidazole/coinitiator systems, e.g. ortho-chlorohexaphenyl-bisimidazole in combination with 2-mercaptobenzothiazole; ferrocenium compounds or titanocenes, for example dicyclopentadienyl-bis(2,6-difluoro-3-pyrrolo-phenyl)-titanium; O-acyloxime ester compounds, as described e.g. in GB 2 339 571, borate compounds, as described, for example, in U.S. Pat. No. 4,772,530, GB 2 307 473, GB 2 333 777. The above-mentioned compounds are used alone or optionally in combination with suitable coinitiators, e.g. amines, thiols, phosphines, maleimides etc.

Especially suitable as component (d) are compounds selected from the group of benzophenones, benzophenone derivatives, acetophenone, acetophenone derivatives, halomethylbenzophenones, halomethylarylsulfones, dialkoxyacetophenones, anthracene, anthracene derivatives, thioxanthone, thioxanthone derivatives, 3-ketocoumarin, 3-ketocoumarin derivatives, anthraquinone, anthraquinone derivatives, α-hydroxy- or α-amino-acetophenone derivatives, α-sulfonylacetophenone derivatives, 4-aroyl-1,3-dioxolanes, benzoin alkyl ethers and benzilketals, phenyl glyoxalates and derivatives thereof, dimeric phenyl glyoxalates, peresters, monoacylphosphine oxides, bisacylphosphine oxides, trisacylphosphine oxides, halomethyltriazines, titanocenes, borate compounds, O-acyloxime compounds, camphorquinone derivatives, iodonium salts, sulfonium salts, iron aryl complexes, oximesulfonic acid esters and photolatent amines.

Of interest as free-radical photoinitiators in the curing method according to the invention are especially compounds of formula I, II, III or/and IV (I)

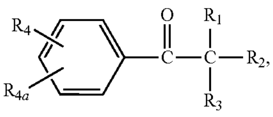
wherein $R_1$ is $C_1$-$C_{12}$alkyl or $C_1$-$C_{12}$alkoxy;

$R_2$ is phenyl, $OR_5$ or $NR_7R_8$;

$R_3$ has one of the definitions given for $R_1$ or is $C_3$-$C_{12}$alkenyl, phenyl-$C_1$-$C_6$alkyl or $C_1$-$C_6$alkylphenyl-$C_1$-$C_6$alkyl;

or $R_1$ and $R_3$, together with the carbon atom to which they are bonded, form a cyclohexyl ring;

$R_2$ being phenyl when $R_1$ and $R_3$ are both alkoxy;

$R_4$ and $R_{4a}$ are each independently of the other hydrogen, $C_1$-$C_{12}$alkyl, $C_1$-$C_{12}$hydroxyalkyl, $OR_5$, $SR_6$, $NR_7R_8$, halogen,

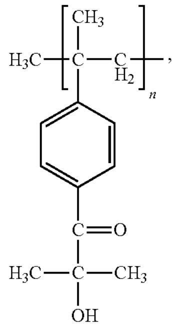

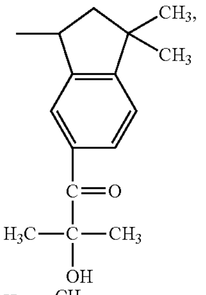

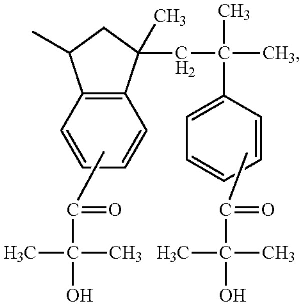

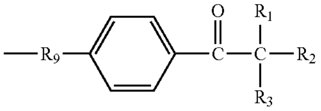

or a monovalent linear or branched siloxane radical;

n is a number from 1 to 10;

$R_5$ and $R_6$ are each independently of the other hydrogen, $C_1$-$C_{12}$alkyl, $C_1$-$C_{12}$alkenyl, phenyl, benzyl, $Si(CH_3)_3$ or —$[C_aH_{2a}X]_b$—$R_{10}$;

$R_7$ and $R_8$ are each independently of the other hydrogen, $C_1$-$C_{12}$alkyl or $C_2$-$C_5$hydroxyalkyl, or $R_7$ and $R_8$, together with the N atom to which they are bonded, form a 5- or 6-membered ring, which may also contain O atoms or a $NR_{11}$ group;

$R_9$ is a single bond, O, S, $NR_{11}$, —$CH_2CH_2$— or

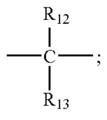

a and b are each independently of the other a number from 1 to 12;

X is S, O or $NR_{11}$;

$R_{10}$ is hydrogen, $C_1$-$C_{12}$alkyl or

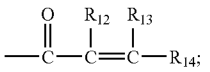

$R_{11}$ is hydrogen, phenyl, phenyl-$C_1$-$C_4$alkyl, $C_1$-$C_{12}$alkyl or $C_2$-$C_5$hydroxyalkyl; and $R_{12}$, $R_{13}$ and $R_{14}$ are each independently of the others hydrogen or methyl;

(II)

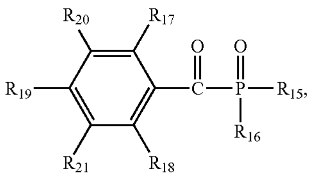

wherein $R_{15}$ and $R_{16}$ are each independently of the other $C_1$-$C_{12}$alkyl, $C_1$-$C_{12}$alkoxy; phenyl which is unsubstituted or substituted by one or more $OR_{22}$, $SR_{23}$, $NR_{24}R_{25}$, $C_1$-$C_{12}$alkyl or halogen substituents; or $R_{15}$ and $R_{16}$ are biphenylyl, naphthyl, phenyl-$C_1$-$C_4$alkyl or

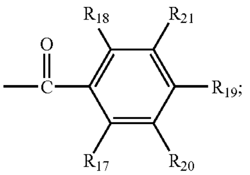

$R_{17}$ and $R_{18}$ are each independently of the other $C_1$-$C_{12}$alkyl, $C_1$-$C_{12}$alkoxy, $CF_3$ or halogen;

$R_{19}$, $R_{20}$ and $R_{21}$ are each independently of the others hydrogen, $C_1$-$C_{12}$alkyl, $C_1$-$C_{12}$alkoxy, $CF_3$ or halogen;

$R_{22}$, $R_{23}$, $R_{24}$ and $R_{25}$ are each independently of the others hydrogen, $C_1$-$C_{12}$alkyl, $C_2$-$C_{12}$-alkenyl, $C_3$-$C_8$cycloalkyl, phenyl, benzyl, or $C_2$-$C_{20}$alkyl which is interrupted by O atoms and is unsubstituted or substituted by OH or/and SH; or $R_{24}$ and $R_{25}$, together with the N atom to which they are bonded, form a 5- or 6-membered ring, which may also contain O or S atoms or an $NR_{26}$ group; and $R_{26}$ is hydrogen, phenyl, phenyl-$C_1$-$C_4$alkyl, $C_1$-$C_{12}$alkoxy, $C_1$-$C_{12}$alkyl or $C_1$-$C_{12}$hydroxyalkyl;

(III)

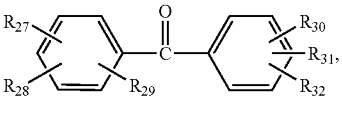

wherein $R_{27}$, $R_{28}$, $R_{29}$, $R_{30}$, $R_{31}$ and $R_{32}$ are each independently of the others hydrogen, $C_1$-$C_4$alkyl, phenyl, naphthyl, —$OR_{35}$, —$SR_{35}$, —(CO)O($C_1$-$C_4$alkyl), halogen, $NR_{33}R_{34}$ or a monovalent linear or branched siloxane radical, or $R_{29}$ and $R_{30}$, each in the o-position to the carbonyl group, together form a S atom; and $R_{33}$ and $R_{34}$ are each independently of the other hydrogen, $C_1$-$C_4$alkyl, $C_2$-$C_6$hydroxyalkyl, or $R_{33}$ and $R_{34}$, together with the N atom to which they are bonded, form a 5- or 6-membered ring, which may also contain O atoms or a $NR_{11}$, group; and $R_{35}$ is $C_1$-$C_{12}$alkyl, $C_2$-$C_6$hydroxyalkyl or phenyl;

(IV)

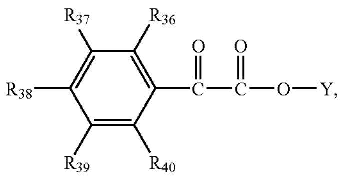

wherein $R_{36}$, $R_{37}$, $R_{38}$, $R_{39}$ and $R_{40}$ are each independently of the others hydrogen, $C_1$-$C_{12}$alkyl unsubstituted or substituted by OH, $C_1$-$C_4$alkoxy, phenyl, naphthyl, halogen, CN and/or by —$OCOR_{41}$, or $C_2$-$C_{12}$alkyl which is interrupted by one or more O atoms, or $R_{36}$, $R_{37}$, $R_{38}$, $R_{39}$ and $R_{40}$ are $OR_{42}$, $SR_{43}$, $NR_{44}R_{45}$, halogen, a monovalent linear or branched siloxane radical, or phenyl unsubstituted or substituted by one or two $C_1$-$C_4$alkyl or/and one or two $C_1$-$C_4$-alkoxy substituents, it being possible for the substituents $OR_{42}$, $SR_{43}$, $NR_{44}R_{45}$ to form 5- or 6-membered rings by way of the radicals $R_{42}$, $R_{43}$, $R_{44}$ and/or $R_{45}$ with further substituents on the phenyl ring or with one of the carbon atoms of the phenyl ring;

$R_{41}$ is $C_1$-$C_8$alkyl, or phenyl unsubstituted or substituted by from one to three $C_1$-$C_4$alkyl and/or one to three $C_1$-$C_4$alkoxy substituents;

$R_{42}$ and $R_{43}$ are each independently of the other hydrogen, $C_1$-$C_{12}$alkyl unsubstituted or substituted by OH, $C_1$-$C_4$alkoxy, phenyl, phenoxy or/and by —$OCOR_{41}$, or $C_2$-$C_{12}$alkyl which is interrupted by one or more O atoms, or $R_{42}$ and $R_{43}$ are phenyl unsubstituted or substituted by $C_1$-$C_4$alkoxy, phenyl or/and by $C_1$-$C_4$alkyl, or $R_{42}$ and $R_{43}$ are $C_3$-$C_6$alkenyl, cyclopentyl, cyclohexyl or naphthyl;

$R_{44}$ and $R_{45}$ are each independently of the other hydrogen, $C_1$-$C_{12}$alkyl unsubstituted or substituted by OH, $C_1$-$C_4$alkoxy or/and by phenyl, or $C_2$-$C_{12}$alkyl which is interrupted by one or more O atoms, or $R_{44}$ and $R_{45}$ are phenyl, —$COR_{41}$ or $SO_2R_{46}$, or $R_{44}$ and $R_{45}$, togetger with the nitrogen atom to which they are bonded, form a 5-, 6- or 7-membered ring, which may also be interrupted by —O— or —$NR_{47}$—;

$R_{46}$ is $C_1$-$C_{12}$alkyl, phenyl or 4-methylphenyl;

$R_{47}$ is hydrogen, $C_1$-$C_8$alkyl unsubstituted or substituted by OH or by $C_1$-$C_4$alkoxy, or is phenyl unsubstituted or substituted by OH, $C_1$-$C_4$alkyl or by $C_1$-$C_4$alkoxy;

Y is

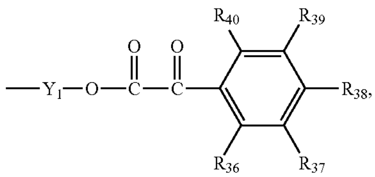

$C_1$-$C_{20}$alkyl, phenyl, naphthyl, phenyl-$C_1$-$C_4$alkyl or a monovalent linear or branched siloxane radical;

$Y_1$ is $C_1$-$C_{12}$alkylene, $C_4$-$C_8$alkenylene, $C_4$-$C_8$alkynylene, cyclohexylene, $C_4$-$C_{40}$alkylene interrupted by one or more —O—, —S— or —$NR_{48}$—, or is phenylene or $Y_1$ is a group

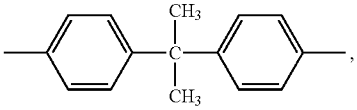

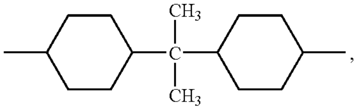

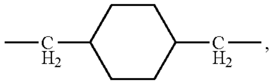

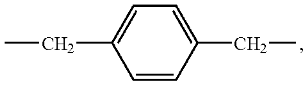

$—CH_2CH(OH)CH_2O—Y_2—OCH_2CH(OH)CH_2—$,
$—CH_2CH(OH)CH_2—$,

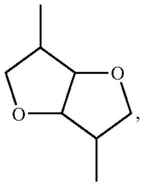

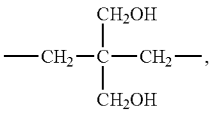

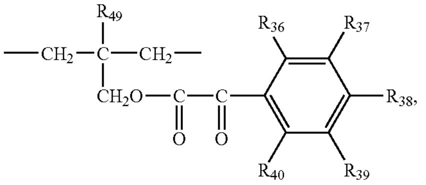

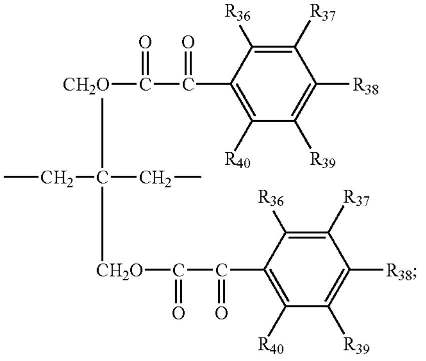

or a divalent linear or branched siloxane radical;

$Y_2$ has the same definitions as $Y_1$ with the exception of the formula $$—CH_2CH(OH)CH_2O—Y_2—OCH_2CH(OH)CH_2—;$$

$R_{48}$ is hydrogen, $C_1$-$C_{12}$alkyl or phenyl; and $R_{49}$ is hydrogen, $CH_2OH$ or $C_1$-$C_4$alkyl.

Of interest is a method as described above wherein component (d) in the composition is at least one compound of formula I or/and II, especially a mixture of a compound of formula I and a compound of formula II.

Preferred compositions comprise compounds of formula I wherein $R_2$ is $NR_7R_8$, or/and compounds of formula II, or/and compounds of formula IV wherein Y is

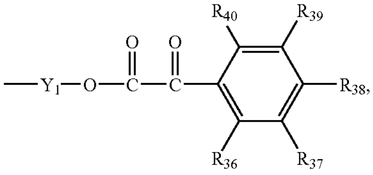

as component (d).

$C_1$-$C_{12}$Alkyl is linear or branched and is, for example, $C_1$-$C_8$—, $C_1$-$C_6$— or $C_1$-$C_4$-alkyl. Examples are methyl, ethyl, propyl, isopropyl, n-butyl, sec-butyl, isobutyl, tert-butyl, pentyl, hexyl, heptyl, 2,4,4-trimethyl-pentyl, 2-ethylhexyl, octyl, nonyl, decyl, undecyl or dodecyl. $C_1$-$C_{12}$Hydroxyalkyl and $C_2$-$C_5$hydroxyalkyl are e.g. $C_1$-$C_{10}$—, $C_2$-$C_{10}$—, $C_1$-$C_8$—, $C_2$-$C_8$—, $C_2$-$C_4$— and $C_1$-$C_4$-alkyl as described above, but mono- or poly-substituted by OH. For example, from 1 to 6, e.g. from 1 to 4, or one or two OH substituents are positioned on the alkyl radical. Examples are hydroxymethyl, hydroxyethyl, dihydroxypropyl, hydroxypropyl, dihydroxyethyl, especially hydroxyethyl.

$C_3$-$C_8$Cycloalkyl is linear or branched alkyl that contains at least one ring, e.g. cyclopropyl, cyclopentyl, methyl-cyclopentyl, cyclohexyl, methyl- or dimethyl-cyclohexyl, or cyclooctyl, especially cyclopentyl or cyclohexyl, preferably cyclohexyl.

$C_2$-$C_{20}$Alkyl that is interrupted one or more times by O atoms is, for example, interrupted by O from 1 to 9 times, e.g. from 1 to 7 times or once or twice. When the radicals are interrupted by a plurality of O atoms, the O atoms are separated from one another by at least one methylene group. There are thus obtained e.g. structural units such as $—CH_2—O—CH_3$, $—CH_2CH_2—O—CH_2CH_3$, $—[CH_2CH_2O]_y—CH_3$, wherein y=1 to 9, $—(CH_2CH_2O)_7CH_2CH_3$, $—CH_2—CH(CH_3)—O—CH_2—CH_2CH_3$ or $—CH_2—CH(CH_3)—O—CH_2—CH_3$.

$C_1$-$C_{12}$Alkoxy denotes linear or branched radicals and is, for example, $C_1$-$C_8$—, $C_1$-$C_6$— or $C_1$-$C_4$-alkoxy. Examples are methoxy, ethoxy, propoxy, isopropoxy, n-butyloxy, sec-butyloxy, isobutyloxy, tert-butyloxy, pentyloxy, hexyloxy, heptyloxy, 2,4,4-trimethylpentyloxy, 2-ethylhexyloxy, octyloxy, nonyloxy, decyloxy or dodecyloxy, especially methoxy, ethoxy, propoxy, isopropoxy, n-butyloxy, sec-butyloxy, isobutyloxy, tert-butyloxy, more especially methoxy.

$C_2$-$C_{12}$Alkenyl radicals can be mono- or poly-unsaturated and linear or branched and are, for example, $C_2$-$C_8$—, $C_2$-$C_8$—, $C_4$-$C_8$—, $C_4$-$C_6$—, $C_6$-$C_8$— or $C_2$-$C_4$-alkenyl. Examples are vinyl, allyl, methallyl, 1,1-dimethylallyl, 1-butenyl, 2-butenyl, 1,3-pentadienyl, 1-hexenyl, 1-octenyl, decenyl or dodecenyl, especially allyl. $R_4$ as $C_2$-$C_8$alkenyl is e.g. $C_2$-$C_6$-, especially $C_2$-$C_4$-alkenyl.

Phenyl-$C_1$-$C_6$alkyl is e.g. benzyl, phenylethyl, α-methylbenzyl, phenylpentyl, phenylhexyl or α,α-dimethylbenzyl, especially benzyl. Phenyl-$C_1$-$C_4$alkyl, especially phenyl-$C_1$-$C_2$alkyl, is preferred.

$C_1$-$C_6$Alkylphenyl-$C_1$-$C_6$alkyl is, for example, 2,4,6-trimethylbenzyl, 2,6-dimethylbenzyl, 2,4,6-trimethylphenylethyl, 4-methylbenzyl or 4-methylphenylethyl, especially 2,4,6-trimethylbenzyl.

Substituted phenyl is mono- to penta-substituted, e.g. mono-, di- or tri-substituted, especially mono- or di-substituted on the phenyl ring.

Halogen is fluorine, chlorine, bromine or iodine, especially chlorine or bromine, preferably chlorine.

When $R_7$ and $R_8$ or $R_{24}$ and $R_{25}$ or $R_{33}$ and $R_{34}$, in each case together with the N atom to which they are bonded, form a 5- or 6-membered ring which may also contain O or S atoms or a group $NR_{11}$, or $NR_{26}$, such a ring is, for example, a saturated or unsaturated ring, for example aziridine, pyrrole, pyrrolidine, oxazole, thiazole, pyridine, 1,3-diazine, 1,2-diazine, piperidine or morpholine.

When in formula III $R_{29}$ and $R_{30}$, each in the o-position to the carbonyl group, together form a S atom, a thioxanthone structure

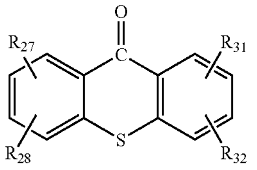

is obtained.

Monovalent or divalent linear or branched siloxane radicals in the context of the present Application may also contain, for example, linear or branched alkylene units or oxaalkylene units.

A monovalent linear or branched siloxane radical is to be understood as being, for example, the following radical

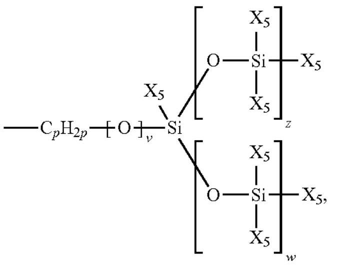

wherein v is 0 or 1; w is a number from 0 to 100 and z is a number from 1 to 100; and $X_5$ is $C_1$-$C_4$alkyl. The radical $C_pH_{2p}$ is linear or branched.

Examples of divalent linear or branched siloxane radicals may, for example, likewise contain linear or branched alkylene units or oxaalkylene units, for example the following radical

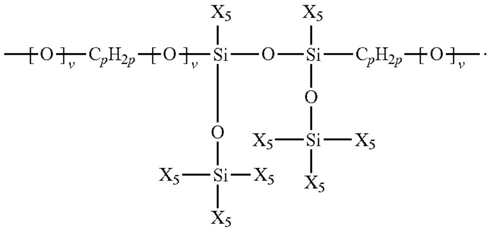

Examples of suitable photoinitiators having siloxane radicals are to be found in EP 1 072 326, WO 02/14439, WO 02/14326, International Application Nos. EP03/00820 and EP03/00819.

Photoinitiator compounds as described above are known in the art. Some of them are commercially available and their preparation is published in the literature and known to the person skilled in the art. The preparation of α-hydroxyketones is disclosed, for example, in EP 3002, EP 161 463, EP 487 993, EP 368 850, and that of α-aminoacetophenones is disclosed in EP 3002, EP 284 561, EP 805 152. The preparation of mono-, bis- and tris-acylphosphine oxides is known, for example, from EP 7508, EP 184 095, WO 96/07662.

Preferred free-radical photoinitiators in the method according to the invention are, for example, 1-benzoylcyclohexanol (®Irgacure 184, Ciba Spezialitätenchemie), 1-[4-(2-hydroxyethoxy)phenyl]-2-hydroxy-2-methyl-1-propan-1-one (®Irgacure 2959, Ciba Spez-ialitätenchemie), [4-(2-acryloyloxyethoxy)-phenyl]-2-hydroxy-2-propyl ketone, 2,2-dimethoxy-1,2-diphenylethan-1-one (®Irgacure 651, Ciba Spezialitätenchemie), (4-morpholino-benzoyl)-1-benzyl-1-dimethylamino-propane (®Irgacure 369, Ciba Spezialitätenchemie), (4-methylthiobenzoyl)-1-methyl-1-morpholino-ethane (®Irgacure 907, Ciba Spezialitätenchemie), 2-hydroxy-2-methyl-1-[4-(4-(2-hydroxy-2-methylpropano-1-yl)benzyl)phenyl]-propanone; bis(2,4,6-trimethylbenzoyl)-phenyl-phosphine oxide (®Irgacure 819, Ciba Spezialitätenchemie), bis(2,6-dimethoxybenzoyl)-2,4,4-trimethylpentylphosphine oxide, bis(2,4,6-trimethylbenzoyl)-(2,4-dipentyloxyphenyl)-phosphine oxide, 2-hydroxy-2-methyl-1-phenyl-propanone (®Darocur 1173, Ciba Spezialitätenchemie), 2-hydroxy-2-methyl-1-(4-isopropyl-phenyl)-propanone, 2-hydroxy-2-methyl-1-(4-dodecyl-phenyl)-propanone, 2,4,6-trimethyl-benzoyl-diphenyl-phosphine oxide, 2,4,6-trimethylbenzoyl-phenyl-phosphinic acid ethyl ester, poly{2-hydroxy-2-methyl-1-[4-(1-methylvinyl)phenyl]propan-1-one}, bis($\eta^5$-2,4-cyclopentadien-1-yl)-bis[2,6-difluoro-3-(1H-pyrrol-1-yl)phenyl]titanium (®Irgacure 784, Ciba Spezialitätenchemie), a mixture of 2,4,6-trimethylbenzophenone and 4-methylbenzophenone; 2,4,6-trimethyl-4'-phenylbenzophenone, 3-methyl-4'-phenylbenzophenone, phenylglyoxylic acid methyl ester, 5,5'-oxodi(ethyleneoxydicarbonylphenyl), 4-dimethylamino-phenylglyoxylic acid methyl ester, thioxanthone, chlorothioxanthone, isopropylthioxanthone, benzophenone, 4,4'-bis(dimethylamino)-benzophenone, 4,4'-bis(diethylamino)-benzophenone, 3,3'-dimethyl-4-methoxybenzophenone, 4-phenylbenzophenone, 1-chloro-4-propoxy-thioxanthone, 2,4-dimethyl- or 2,4-diethyl-thioxanthone. It is of course also possible to use any mixtures of the above-mentioned compounds.

Also suitable, for example, are photoinitiator compounds that contain siloxane-containing radicals. Such compounds are especially suitable for use in surface coatings, especially automotive finishes, that are cured by the method according to the invention. In such a case the photoinitiators are not distributed as homogeneously as possible in the formulation to be cured but become selectively concentrated at the surface of the coating to be cured, that is to say the initiator becomes specifically oriented relative to the surface of the formulation. When the formulations to be cured contain siloxane it is especially advantageous to use such siloxane-containing photoinitiators, because they ensure homogeneous distribution of the initiator in the formulation.

Further suitable examples of photoinitiators are J. V. Crivello, K. Dietliker, Photoinitiators for Free Radical, Cationic & Anionic Photopolymerisation, Vol. III, 2nd edition, insbesondere pages 276-298.

In the context of the present invention, the above list is to be understood as being merely by way of example and on no account as a limitation.

Suitable photoinitiators for crosslinking component (b) are e.g. cationic photoinitiators, for example aromatic sulfonium, phosphonium or iodonium salts, such as are described e.g. in U.S. Pat. No. 4,950,581, column 18, line 60 to column 19, line 10, or cyclopentadienylarene-iron(II) complex salts, e.g. ($\eta^6$-isopropylbenzene)($\eta^5$-cyclopentadienyl)iron (II) hexafluorophosphate, or oxime-based photolatent acids, as described, for example, in GB 2 348 644, U.S. Pat. No. 4,450,598, U.S. Pat. No. 4,136,055, WO 00/10972, WO 00/26219.

Preferred photolatent acids are, for example, compounds of formula V, VI, VII or/and VIIa (V)

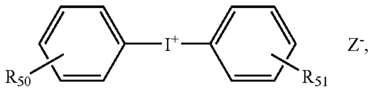

wherein $R_{50}$ and $R_{51}$ are each independently of the other hydrogen, $C_1$-$C_{20}$alkyl, $C_1$-$C_{20}$alkoxy, OH— substituted $C_1$-$C_{20}$alkoxy, halogen, $C_2$-$C_{12}$alkenyl, cycloalkyl, especially methyl, isopropyl or isobutyl; and Z is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

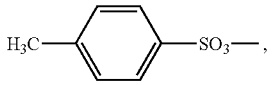

$CH_3$—$SO_3$, $ClO_4$, $PO_4$, $NO_3$, $SO_4$, $CH_3$—$SO_4$,

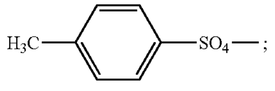

(VI)

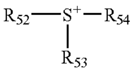 $Z^-$, wherein $R_{52}$, $R_{53}$ and $R_{54}$ are each independently of the others unsubstituted phenyl, or phenyl substituted by —S-phenyl or by

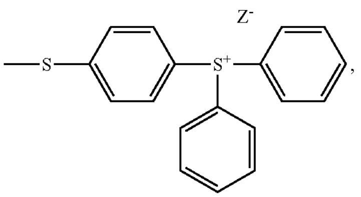

Z is as defined above;

(VII)

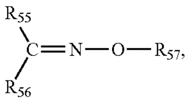 or

-continued (VIIa)

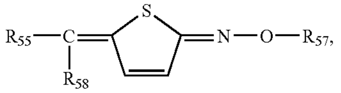 wherein $R_{55}$ is

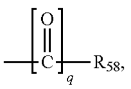

(CO)O—$C_1$-$C_4$alkyl, CN or $C_1$-$C_{12}$haloalkyl;

$R_{56}$ has one of the definitions given for $R_{55}$ or is

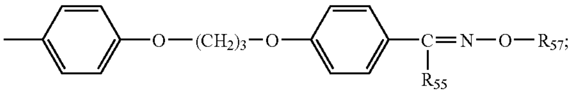

$R_{57}$ is $C_1$-$C_{18}$alkylsulfonyl, $C_1$-$C_{10}$haloalkylsulfonyl, camphorylsulfonyl, phenyl-$C_1$-$C_3$alkylsulfonyl, $C_3$-$C_{30}$cycloalkylsulfonyl, phenylsulfonyl, naphthylsulfonyl, anthracylsulfonyl or phenanthrylsulfonyl, the groups cycloalkyl, phenyl, naphthyl, anthracyl and phenanthryl of the radicals $C_3$-$C_{30}$cycloalkylsulfonyl, phenyl-$C_1$-$C_3$alkylsulfonyl, phenylsulfonyl, naphthylsulfonyl, anthracylsulfonyl and phenanthrylsulfonyl being unsubstituted or substituted by one or more halogen, $C_1$-$C_4$haloalkyl, CN, $NO_2$, $C_1$-$C_{16}$alkyl, phenyl, $C_1$-$C_4$-alkylthio, $C_1$-$C_4$alkoxy, phenoxy, $C_1$-$C_4$alkyl-O(CO)—, $C_1$-$C_4$alkyl-(CO)O—, $R_{67}OSO_2$— and/or —$NR_6OR_{61}$ substituents; or $R_{67}$ is $C_2$-$C_6$haloalkanoyl, halobenzoyl,

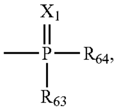 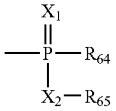 or 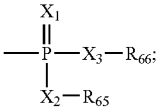

$X_1$, $X_2$ and $X_3$ are each independently of the others O or S;

q is 0 or 2; and $R_{58}$ is $C_1$-$C_{12}$alkyl, cyclohexyl, camphoryl, unsubstituted phenyl, or phenyl substituted by one or more halogen, $C_1$-$C_{12}$alkyl, $OR_{59}$, $SR_{59}$ or $NR_{60}R_{61}$ substituents;

$R_{59}$ is $C_1$-$C_{12}$alkyl, phenyl, phenyl-$C_1$-$C_4$alkyl or $C_1$-$C_{12}$hydroxyalkyl;

$R_{60}$ and $R_6$, are each independently of the other hydrogen, $C_1$-$C_4$alkyl, $C_2$-$C_6$hydroxyalkyl, or $R_{60}$ and $R_{61}$, together with the N atom to which they are bonded, form a 5- or 6-membered ring, which may also contain O atoms or an $NR_{62}$ group;

$R_{62}$ is hydrogen, phenyl, phenyl-$C_1$-$C_4$alkyl, $C_1$-$C_{12}$alkyl or $C_2$-$C_5$hydroxyalkyl;

$R_{63}$, $R_{64}$, $R_{65}$ and $R_{66}$ are each independently of the others $C_1$-$C_6$alkyl, $C_1$-$C_6$haloalkyl; or phenyl unsubstituted or substituted by $C_1$-$C_4$alkyl or by halogen; and $R_{67}$ is hydrogen, $C_1$-$C_4$alkyl, phenyl or tolyl.

The specific meanings of the radicals are as described above.

Compounds of formulae V, VI, VII and VIIa are generally known and are in some cases commercially available. Their preparation is known to the person skilled in the art and frequently described in the literature.

Suitable iodonium salts are e.g. tolylcumyliodonium tetrakis(pentafluorophenyl)borate, 4-[(2-hydroxy-tetradecyloxy)phenyl]phenyliodonium hexafluoroantimonate or hexafluorophosphate (SarCat® CD 1012; Sartomer), tolylcumyliodonium hexafluorophosphate, 4-isobutylphenyl-4'-methylphenyliodonium hexafluorophosphate (®Irgacure 250, Ciba Spezialitätenchemie), 4-octyloxyphenyl-phenyliodonium hexafluorophosphate or hexafluoroantimonate, bis (dodecyl-phenyl)iodonium hexafluoroantimonate or hexafluorophosphate, bis(4-methylphenyl)-iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecyl-phenyliodonium hexafluorophosphate, 4-methylphenyl-4'-phenoxyphenyliodonium hexafluorophosphate. Of all the iodonium salts mentioned, compounds with other anions are, of course, also suitable. The preparation of iodonium salts is known to the person skilled in the art and described in the literature, for example U.S. Pat. No. 4,151,175, U.S. Pat. No. 3,862,333, U.S. Pat. No. 4,694,029, EP 562 897, U.S. Pat. No. 4,399,071, U.S. Pat. No. 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Suitable sulfonium salts are obtainable, for example, under the trade names ®Cyracure UVI-6990, ® Cyracure UVI-6974 (Union Carbide), ®Degacure KI 85 (Degussa), SP-55, SP-150, SP-170 (Asahi Denka), GE UVE 1014 (General Electric), SarCat® KI-85 (=triarylsulfonium hexafluorophosphate; Sartomer), SarCat® CD 1010 (=mixed triarylsulfonium hexafluoroantimonate; Sartomer); SarCat® CD 1011 (=mixed triarylsulfonium hexafluorophosphate; Sartomer).

Suitable oximesulfonates and their preparation can be found, for example, in WO 00/10972, WO 00/26219, GB 2 348 644, U.S. Pat. No. 5,450,598, WO 98/10335, WO 99/01429, EP 780 729, EP 821 274, U.S. Pat. No. 5,237,059, EP 571 330, EP 241 423, EP 139 609, EP 361 907, EP 199 672, EP 48615, EP 12158.

A summary of further photolatent acid donors is given in the form of a review by M. Shirai and M. Tsunooka in Prog. Polym. Sci., Vol. 21, 1-45 (1996).

Preferred photolatent acids in the method according to the invention are 4-octyloxyphenyl-phenyliodonium hexafluoroantimonate, 4-(2-hydroxy-tetradecyl-1-oxyphenyl)-phenyliodonium hexafluoroantimonate, 4-decyloxyphenyl-phenyliodonium hexafluorophosphate, 4-decylphenyl-phenyl-iodonium hexafluorophosphate, 4-isopropylphenyl-4'-methylphenyliodonium tetra(pentafluorophenyl)borate, 4-isopropylphenyl-4'-methylphenyliodonium hexafluorophosphate, 4-isobutylphenyl-4'-methylphenyliodonium tetra (pentafluorophenyl)borate, 4-isobutylphenyl-4'-methylphenyl-iodonium hexafluorophosphate, ®Cyracure 6974 and ®Cyracure UVI 6990 from Union Carbide, ($\eta^6$-isopropylbenzene)($\eta^5$-cyclopentadienyl)iron(II) hexafluorophosphate.

Examples of suitable oximesulfonates are α-(methylsulfonyloxyimino)-4-methoxybenzylcyanide, α-(octylsulfonyloxyimino)-4-methoxybenzylcyanide, α-(methylsulfonyloxyimino)-3-methoxybenzylcyanide, α-(methylsulfonyloxyimino)-3,4-dimethylbenzylcyanide, α-(methyl-sulfonyloxyimino)-thiophene-3-acetonitrile, α-(isopropylsulfonyloxyimino)-thiophene-2-acetonitrile, cis/trans-α-(dodecylsulfonyloxyimino)-thiophene-2-acetonitrile,

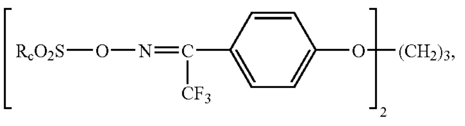

wherein $R_c$ is haloalkyl, especially $CF_3$, and alkyl, especially propyl;

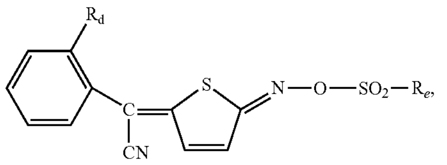

wherein $R_d$ is alkyl, especially methyl, and $R_e$ is alkyl, especially methyl, propyl, octyl, camphoryl, p-tolyl or

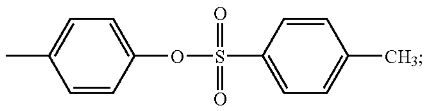

etc.

Oxime compounds that yield acids other than sulfonic acids are likewise suitable and are disclosed, for example, in WO 00/26219.

In the context of the present invention, the above list is to be understood as being merely by way of example and on no account as a limitation.

As photolatent bases there come into consideration, for example, capped amine compounds, for example generally the photolatent bases known in the art. Examples are compounds of the classes: o-nitrobenzyloxycarbonylamines, 3,5-dimethoxy-α,α-dimethylbenzyloxycarbonylamines, benzoin carbamates, derivatives of anilides, photolatent guanidines, generally photolatent tertiary amines, for example ammonium salts of α-ketocarboxylic acids, or other carboxylates, benzhydrylammonium salts, N-(benzophenonylmethyl)-tri-N-alkyammonium triphenylalkyl borates, photolatent bases based on metal complexes, e.g. cobalt amine complexes, tungsten and chromium pyridinium pentacarbonyl complexes, anion-generating photoinitators based on metals, such as chromium and cobalt complexes "Reinecke salts" or metalloporphyrins. Examples thereof are published in J. V. Crivello, K. Dietliker "Photoinitiators for Free Radical, Cationic & Anionic Photopolymerisation", Vol. III of "Chemistry & Technology of UV & EB Formulation for Coatings, Inks & Paints", 2nd Ed., J. Wiley and Sons/SITA Technology (London), 1998.

Also suitable as component (d) of the compositions according to the invention are bases as described in WO 97/31033. They are especially latent bases based on seconday amines, guanidines or amidines. Examples are compounds of formula (A)

(A)

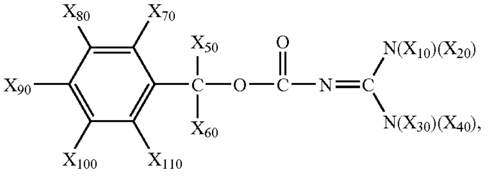

wherein $X_{10}$, $X_{20}$, $X_{30}$, $X_{40}$, $X_{50}$, $X_{60}$, $X_{70}$, $X_{80}$, $X_{90}$, $X_{100}$ and $X_{110}$ are each independently of the others hydrogen, $C_1$-$C_{20}$alkyl, aryl, arylalkyl, halogen, alkoxy, aryloxy, arylalkyloxy, aryl-N—, alkyl-N—, arylalkyl-N—, alkylthio, arylthio, arylalkylthio, NO—, CN, a carboxylic acid ester radical, a carboxyilic acid amide radical or a ketone or aldehyde radical, or $X_{10}$, $X_{20}$, $X_{30}$ and $X_{40}$ may form a ring structure and $X_{50}$, $X_{60}$, $X_{70}$, $X_{80}$, $X_{90}$, $X_{100}$ and $X_{110}$ independently of $X_{10}$, $X_{20}$, $X_{30}$ and $X_{40}$ may form one or more further ring structures.

Other suitable photolatent bases are disclosed in EP 764 698. They are capped amino compounds, for example of formula (B)

(B)

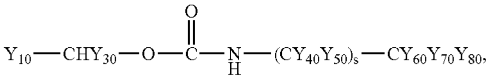

wherein $Y_{10}$ is a radical

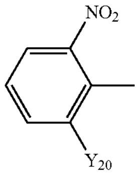

or

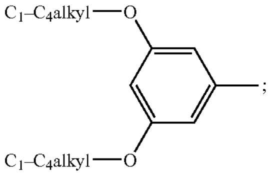

;

$Y_{20}$ is hydrogen or $NO_2$;

$Y_{30}$ is hydrogen or $C_1$-$C_8$alkyl;

$Y_{40}$, $Y_{50}$, $Y_{60}$, $Y_{70}$ and $Y_{80}$ are each independently of the others hydrogen or F; and s is a number from 15 to 29.

It is also possible, especially, to use compounds based on α-aminoketones, as described in EP 898 202 and WO 98/32756, based on α-ammonium, iminium or amidinium ketones and arylborates, as disclosed in WO 98/38195, and based on α-aminoalkenes according to WO 98/41524.

In the compositions according to the invention it is preferred to use compounds from which an amidine group is removed on irradiation with visible light or UV light. They contain a structural element of formula (C)

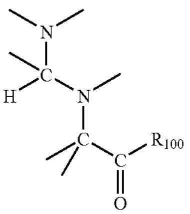

or

-continued (D)

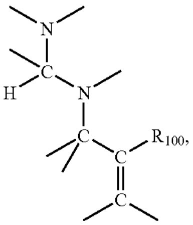

, wherein wherein $R_{100}$ is an aromatic or heteroaromatic radical capable of absorbing light in a wavelength range of from 200 to 650 nm which, on absorption, effects cleavage of the adjacent carbon-nitrogen bond.

Of special interest are

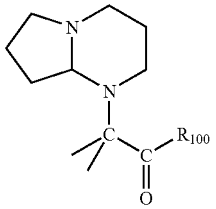

and

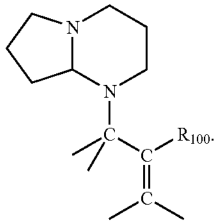

.

Examples of $R_{100}$ are phenyl, biphenylyl, naphthyl, phenanthryl, anthracyl, pyrenyl, 5,6,7,8-tetrahydro-2-naphthyl, 5,6,7,8-tetrahydro-1-naphthyl, thienyl, benzo[b]thienyl, naphtho-[2,3-β]thienyl, thianthrenyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl and phenoxazinyl, those radicals being unsubstituted or mono- or poly-substituted, for example, by alkyl, alkenyl, alkynyl, haloalkyl, $NO_2$, amino groups, $N_3$, OH, CN, alkoxy, alkylthio, alkylcarbonyl, alkoxycarbonyl or by halogen, or $R_{100}$ is

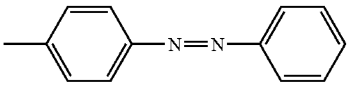

unsubstituted or mono- or poly-substituted e.g. by alkyl, alkenyl, alkynyl, haloalkyl, $NO_2$, amino groups, $N_3$, OH, CN, alkoxy, alkylthio, alkylcarbonyl, alkoxy-carbonyl or by halogen.

Preferred photolatent bases are, for example, compounds of formula VIII (VIII)

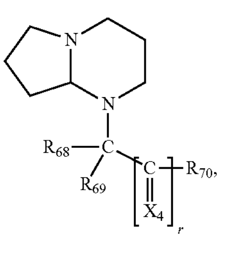

wherein r is 0 or 1;

$X_4$ is $CH_2$ or O;

$R_{68}$ and $R_{69}$ are each independently of the other hydrogen or $C_1$-$C_{20}$alkyl; and $R_{70}$ is unsubstituted or $C_1$-$C_{12}$alkyl- or $C_1$-$C_{12}$alkoxy-substituted phenyl, naphthyl or biphenylyl.

The preparation of the compounds of formulae (C), (D) and (VIII) is known and is described in WO 98/32756, WO 98/38195, WO 98/41524, WO 00/10964 and EP Application No. EP02/11238. Those specifications also provide specific examples of such compounds. Also suitable as photolatent base donors are the α-aminoketone compounds described in EP 898 202, for example (4-morpholinobenzoyl)-1-benzyl-1-dimethylamino-propane or (4-methylthiobenzoyl)-1-methyl-1-morpholino-ethane.

Examples of preferred photolatent bases in the method according to the invention are

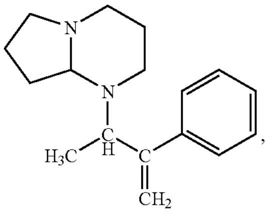,
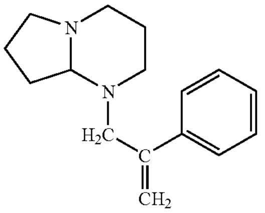 and

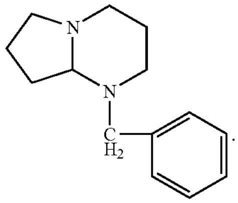.

In some cases it may be advantageous to use mixtures of two or more photoinitiators. They may be mixtures of a plurality of free-radical photoinitiators, mixtures of a plurality of photolatent acids, mixtures of a plurality of photolatent bases, and also mixtures of free-radical photoinitiators with photolatent acids (e.g. for use in so-called hybrid systems) or mixtures of free-radical photoinitiators and photolatent bases or mixtures of free-radical photoinitiators with photolatent acids and photolatent bases.

The photopolymerisable compositions comprise the photoinitiator (d) advantageously in an amount of from 0.01 to 20% by weight, e.g. from 0.05 to 15% by weight, preferably from 0.1 to 20% by weight, e.g. from 1 to 15% by weight, preferably from 1 to 5% by weight, based on the composition. The given amount of photoinitiator relates to the sum of all added photoinitiators when mixtures thereof are used.

Special mention should be made of a method wherein a composition comprising (a) at least one free-radical-polymerisable compound or (b) at least one compound that, under the action of an acid, is able to enter into a polymerisation, polycondensation or polyaddition reaction, or (c) at least one compound that, under the action of a base, is able to enter into a polymerisation, polycondensation or polyaddition reaction, or a mixture of components (a) and (b), or a mixture of components (a) and (c); and (d) at least one photolatent compound that is activatable by plasma discharge;

is applied to a substrate, preferably a three-dimensional substrate and especially a metal or plastic substrate, and then cured in a plasma discharge chamber.

Also to be regarded as plasma-curable systems are, for example, formulations as described in U.S. Pat. No. 5,446,073. They are, for example, formulations comprising charge transfer complex compounds which are composed of at least one unsaturated compound containing an electron donor group and at least one compound containing an electron acceptor group. A photoinitiator is generally not required for curing such a formulation. Examples are formulations of maleic, fumaric or itaconic acid esters, amides and amide semiesters as electron acceptor group and vinyl ether and alkenyl ether compounds as electron donor groups. For a specific description, reference is made e.g. to the U.S. patent mentioned above.

Those systems which are curable even without the addition of a photoinitiator or which themselves act as photoinitiator are based, for example, on maleimide compounds (MI) or, especially, on a combination of maleimide/vinyl ether compounds (MI/VE), it also being possible to use other vinyl or allyl derivatives as the "vinyl ether" component. It is also possible for combinations of maleimide with styryloxy compounds or e.g. vinyl amides to be used as photoinitiator-free systems.

Examples of suitable maleimide components are bismaleimide of versamine, N-n-butylmaleimide, N-ethylmaleimide, N-tert-butylmaleimide, N-methylmaleimide, N-cyclohexylmaleimide, N-phenylmaleimide, N-(2,6-dimethylphenyl)maleimide, N-benzylmaleimide, cyclohexyl ester maleimide, triethylene glycol bismaleimide, and also trismaleimide compounds. The maleimides can also be in oligomeric form.

Examples of "vinyl ether" components are $CH_2{=}CH{-}O{-}(CH_2)_4{-}(CO){-}(CH_2)_2{-}(CO){-}(CH_2)_4{-}O{-}CH{=}CH_2$, tris[(4-ethenyloxy)butyl]-1,2,4-phenyltricarboxylic acid ester, cyclohexanedimethanol divinyl ether, diethylene glycol divinyl ether, triethylene glycol divinyl ether, hexanediol divinyl ether, N-vinylpyrrolidone, aromatic polyesters of vinyl ether resins, polyfunctional polyesters of vinyl ether resins, and aliphatic urethane divinyl ether resins. Such systems are also described, for example, by Aylvin A. Diaz et al. in "Conference Proceedings Radtech Europe, 1999, Berlin", pp 473-482 and by Norbert Pietschmann in "Conference Proceedings Radtech Europe, 2001, Basel", pp 531-537.

Other suitable, vinyl-acrylate-based photoinitiator-free systems are described, for example, in EP 1 260 557, U.S. 2003/0021565 and U.S. Pat. No. 6,470,128.

The invention therefore relates also to a method of curing a composition comprising (1) a combination of at least one electron acceptor compound, especially a maleimide compound, and at least one electron donor compound, especially a vinyl ether compound; and (2) optionally at least one free-radical-polymerisable compound (a), wherein the curing is carried out in a plasma discharge chamber.

Using the method according to the invention it is also possible to cure compositions that comprise both thermally curable and UV curable components.

The invention therefore relates also to a method of curing a composition comprising (a) at least one free-radical-polymerisable component having at least one ethylenically unsaturated double bond, the free-radical-polymerisable component optionally additionally being functionalised with OH, $NH_2$, COOH, epoxy or NCO groups; and (a1) at least one polyacrylate or/and polyester polyol in combination with melamine or with a melamine derivative, or in combination with a blocked or non-blocked polyisocyanate; or (a2) at least one carboxyl-, anhydride- or amino-functional polyester or/and at least one carboxyl-, anhydride- or amino-functional polyacrylate in combination with an epoxy-functional polyester or polyacrylate; or (a3) mixtures of (a1) and (a2);

(d) at least one photolatent compound that is activatable by plasma discharge;

wherein the curing of the composition is carried out in a plasma discharge chamber and, optionally, thermal pre- or after-treatment is carried out.

Suitable free-radical-polymerisable components (a) are those described above. Especially suitable components (a) are those which contain, in addition to the ethylenically unsaturated double bond, further functional groups such as OH, $NH_2$, COOH, epoxy or NCO. Such compounds are known to the person skilled in the art and are used widely in the art.

As thermally crosslinkable component, the compositions comprise, for example, combinations of polyacrylates or/and polyester polyols in combination with melamine or, especially, with melamine derivatives (a1). Also suitable are combinations of carboxyl-, anhydride- or amino-functional polyesters or/and carboxyl-, anhydride- or amino-functional polyacrylates in combination with epoxy-functional polyesters or polyacrylates (a2). Such compounds are likewise familiar to the person skilled in the art. Of course it is also possible to use any desired mixture of the thermally curing components (a1) and (a2).

Examples of such systems are:

two-component systems of hydroxyl-group-containing polyacrylates, polyesters and/or polyethers and aliphatic or aromatic polyisocyanates; two-component systems of functional polyacrylates and a polyepoxide, the polyacrylate containing thiol, amino, carboxyl and/or anhydride groups, as described, for example, in EP 898 202; two-component systems of fluorine-modified or silicone-modified hydroxyl-group-containing polyacrylates, polyesters and/or polyethers and aliphatic or aromatic polyisocyanates; two-component systems of (poly)ketimines and aliphatic or aromatic polyisocyanates; two-component systems of (poly)ketimines and unsaturated acrylate resins or acetoacetate resins or methyl-α-acrylamido-methyl glycolate; two-component systems of (poly) oxazolidines and anhydride-group-containing polyacrylates or unsaturated acrylate resins or polyisocyanates; two-component systems of epoxy-group-containing polyacrylates and carboxyl-group-containing or amino-group-containing polyacrylates; polymers based on allyl glycidyl ethers; two-component systems of a (poly)alcohol and/or (poly)thiol and a (poly)isocyanate; two-component systems of an α,β-ethylenically unsaturated carbonyl compound and a polymer containing activated $CH_2$ groups, the activated $CH_2$ groups being present either in the main chain or in the side chain or in both, as described, for example, in EP 161 697 for (poly)malonate groups. Other compounds having activated $CH_2$ groups are (poly)acetoacetates and (poly)cyanoacetates; two-component systems of a polymer containing activated $CH_2$ groups, the activated $CH_2$ groups being present either in the main chain or in the side chain or in both, or a polymer having activated $CH_2$ groups, such as a (poly)acetoacetate or (poly) cyanoacetate, and a polyaldehyde crosslinking agent, for example terephthalic aldehyde. Such systems are described, for example, in Urankar et al., Polym. Prepr. (1994), 35, 933.

Within those combinations, special preference is given to the following:

two-component systems of hydroxyl-group-containing polyacrylates, polyesters and/or polyethers and aliphatic or aromatic polyisocyanates; two-component systems of functional polyacrylates and a polyepoxide, the polyacrylate containing thiol, amino, carboxyl and/or anhydride groups; two-component systems of epoxy-group-containing polyacrylates and carboxyl-group-containing or amino-group-containing polyacrylates; two-component systems of a (poly)alcohol and/or (poly)thiol and a (poly)isocyanate, and two-component systems of an α,β-ethylenically unsaturated carbonyl compound and a polymer containing activated $CH_2$ groups, the activated $CH_2$ groups being present either in the main chain or in the side chain or in both.

The invention relates also to the coated substrate coated on at least one surface by means of the method according to the invention.

The photopolymerisable mixtures may comprise, in addition to the photoinitiator, various additives (h). Examples thereof are thermal inhibitors, which are intended to prevent pre-mature polymerisation, e.g. hydroquinone, hydroquinone derivatives, p-methoxyphenol, β-naphthol or sterically hindered phenols, e.g. 2,6-di(tert-butyl)-p-cresol, or 4-hydroxy-2,2,6,6-tetramethyl-piperidin-1-oxyl (p-hydroxy-tempo), bis(2,2,6,6-tetramethyl-1-oxyl-4-piperidinyl)-sebacate and 1-methyl-8-(2,2,6,6-tetramethyl-1-oxyl-4-piperidinyl)-sebacate. In order to increase dark storage stability it is possible to use, for example, copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, e.g. tetramethylammonium chloride or trimethylbenzylammonium chloride, or hydroxylamine derivatives, e.g. N-diethylhydroxylamine.

As light stabilisers (e) it is possible to add UV absorbers, e.g. those of the hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS).

Examples of such UV absorbers and light stabilisers (e) are 1. 2-(2'-Hydroxyphenyl)-benzotriazoles, e.g. 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzo-triazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxycarbonylethyl)-phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)-phenyl)-5-chlorobenzotriazole, 2-(3'-tert-butyl-2'-hydroxy-5'-(2-methoxycarbonylethyl)-phenyl)-benzotriazole, 2-(3'-tert-butyl-2'-hydroxy-5'-(2-octyloxycarbonylethyl)-phenyl)-benzotriazole, 2-(3'-tert-butyl-5'-[2-(2-ethylhexyloxy)-carbonylethyl]-2'-hydroxyphenyl)-benzotriazole, 2-(3'-dodecyl-2'-hydroxy-5'-methylphenyl)-benzotriazole and 2-(3'-tert-butyl-2'-hydroxy-5'-(2-isooctyloxycarbonylethyl)-phenylbenzotriazole, 2,2'-methylene-bis[4-(1,1,3,3-tetramethylbutyl)-6-benzotriazol-2-yl-phenol]; the transesterification product of 2-[3'-tert-butyl-5'-(2-methoxy-carbonylethyl)-2'-hydroxyphenyl]-benzotriazole with polyethylene glycol 300; $[R—CH_2CH_2—COO(CH_2)_3]_2—$ wherein R=3'-tert-butyl-4'-hydroxy-5'-2H-benzotriazol-2-yl-phenyl.

2. 2-Hydroxyenzophenones, e.g. a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

3. Esters of unsubstituted or substituted benzoic acids, e.g. 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester and 3,5-di-tert-butyl-4-hydroxybenzoic acid 2-methyl-4,6-di-tert-butyl-phenyl ester.

4. Acrylates, e.g. α-cyano-β,β-diphenylacrylic acid ethyl ester or isooctyl ester, α-methoxycarbonylcinnanmic acid methyl ester, α-cyano-β-methyl-p-methoxycinnamic acid methyl ester or butyl ester, α-methoxycarbonyl-p-methoxycinnamic acid methyl ester and N-(β-methoxy-carbonyl-β-cyanovinyl)-2-methyl-indoline.

5. Sterically hindered amines, e.g. bis(2,2,6,6-tetramethylpiperidyl) sebacate, bis(2,2,6,6-tetramethylpiperidyl)succinate, bis(1,2,2,6,6-pentamethylpiperidyl)sebacate, n-butyl-3,5-di-tert-butyl-4-hydroxybenzyl-malonic acid bis(1,2,2,6,6-pentamethylpiperidyl)ester, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylene-diamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro-[4.5]decane-2,4-dione, bis(1-octyloxy-2,2,6,6-tetramethylpiperidyl) sebacate, bis(1-octyloxy-2,2,6,6-tetramethylpiperidyl)succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)-pyrrolidine-2,5-dione, 3-dodecyl-1-(1,2,2,6,6-pentamethyl-4-piperidyl)-pyrrolidine-2,5-dione, 2,4-bis[N-(1-cyclohexyloxy-2,2,6-6-tetramethylpiperidin-4-yl)-n-butyl-amino]-6-(2-hydroxyethyl)amino-1,3,5-triazine and the condensation product of 2,4-bis[1-cyclohexyloxy-2,2,6,6-tetramethylpiperidin-4-yl)butylamino]-6-chloro-s-triazine and N,N'-bis(3-aminopropyl)ethylenediamine.

6. Oxalic acid diamides, e.g. 4,4'-dioctyloxy-oxanilide, 2,2'-diethoxy-oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide, and mixtures of o- and p-methoxy- and of o- and p-ethoxy-disubstituted oxanilides.

7. 2-(2-Hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxy-phenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)-phenyl]-4,6-bis(2,4-dimethylphenyl)-1,3,5-triazine, 2-[2-hydroxy-4-(2-hydroxy-3-octyloxy-propyloxy)-phenyl]-4,6-bis(2,4-dimethylphenyl)-1,3,5-triazine and 2-[4-dodecyloxy/tridecyloxy-(2-hydroxypropyl)oxy-2-hydroxy-phenyl]-4,6-bis(2,4-dimethylphenyl)-1,3,5-triazine.

8. Phosphites and phosphonites, e.g. triphenyl phosphite, diphenylalkyl phosphites, phenyldialkyl phosphites, tris(nonylphenyl) phosphite, trilauryl phosphite, trioctadecyl phosphite, distearyl-pentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)-pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-di-oxaphosphocine, bis(2,4-di-tert-butyl-6-methylphenyl)methyl phosphite and bis(2,4-di-tert-butyl-6-methylphenyl)ethyl phosphite.

9. Further inorganic compounds, e.g. nano-titanium dioxide Examples of UV absorbers and light stabilisers suitable as components (e) also include “Krypto-UVA” as described e.g. in EP 180 548. It is also possible to use latent UV absorbers, as described e.g. by Hida et al in RadTech Asia 97, 1997, page 212.

The proportion of light stabilisers (e) in the formulations according to the invention is, for example, from 0.01 to 10% by weight, for example from 0.05 to 5% by weight, especially from 0.1 to 5% by weight, based on the binder solid. The concentrations to be used vary according to the layer thickness of the coating. The thinner the layer, the higher must be the concentration of component (e) that is chosen. This will be known to the person skilled in the art and is widely described in the literature.

Additives customary in the art, e.g. antistatics, flow improvers and adhesion enhancers, can also be used.

A large number of amines can be used as further additives (h) to accelerate photo-polymerisation, e.g. triethanolamine, N-methyl-diethanolamine, p-dimethylaminobenzoic acid ethyl ester or Michler’s ketone and corresponding derivatives.

Amides and other amine derivatives are also known as accelerators. The amine-modified acrylates (aminoacrylates) already mentioned above (as component (a)) can also act as accelerators in this context, as can also acrylated polyethylene glycol derivatives as described above. Also of special interest are the amine synergist compounds known to the person skilled in the art, for example Michler’s ketone and corresponding derivatives, (EDB)

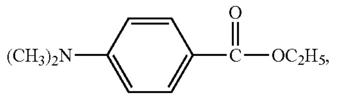

(BEDB)

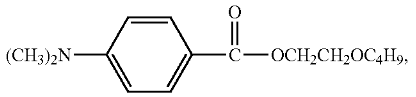

(DMB)

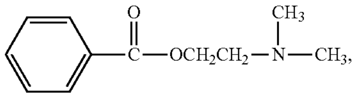

(EHA)

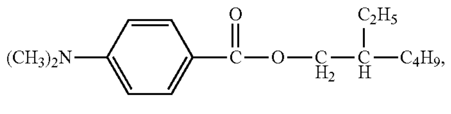

(PDA)

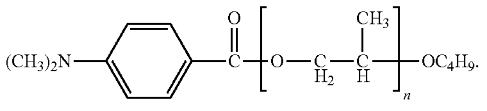

The action of the amines can be intensified by the addition of aromatic ketones, e.g. of the benzophenone type. Further accelerators, coinitiators and autooxidisers are thiols, thioethers, disulfides and phosphines, as described e.g. in EP 438 123 and GB 2 180 358.

It is also possible for chain-transfer reagents customary in the art to be added to the compositions. Examples are mercaptans, amines and benzothiazole.

The curing operation can be assisted especially by pigmented compositions (pigmented e.g. with titanium dioxide), and also by the addition as additional additive (h) of a component that forms free radicals under thermal conditions, e.g. an azo compound, such as 2,2'-azobis(4-methoxy-2,4-dimethylvaleronitrile), a triazene, a diazosulfide, pentazadiene or a peroxy compound, for example hydroperoxide or peroxycarbonate, e.g. tert-butyl hydroperoxide, as described e.g. in EP 245 639.

The compositions according to the invention may also comprise as further additives (h) a photo-reducible dye, e.g. a xanthene, benzoxanthene, benzothioxanthene, thiazine, pyronine, porphyrin or acridine dye, and/or a trihalomethyl compound cleavable by radiation. Similar compositions are described, for example, in EP 445 624.

It is also possible to add as additive (h) additives for increasing the mechanical stability, e.g. for increasing scratch-resistance, in the form of nanoparticles. Examples are dislcosed in EP114917.

Further customary additives (h)—according to the intended use—are fluorescent whitening agents, fillers, pigments, white and coloured pigments, dyes, antistatics, wetting agents and flow improvers.

For curing thick and pigmented coatings, the addition of glass microspheres or pulverised glass fibers, as described e.g. in U.S. Pat. No. 5,013,768, is suitable.

The choice of additives is governed by the field of use in question and the properties desired for that field. The above-described additives (h) are customary in the art and are accordingly used in the amounts customary in the art.

The proportion of additional additives (h) in the formulations according to the invention is, for example, from 0.01 to 10% by weight, for example from 0.05 to 5% by weight, especially from 0.1 to 5% by weight.

Crosslinking can be accelerated by the addition of photosensitisers (f) which shift or broaden the spectral sensitivity. Such photosensitisers are especially aromatic carbonyl compounds, for example benzophenone derivatives, thioxanthone derivatives, especially isopropylthioxanthone, anthraquinone derivatives and 3-acylcoumarin derivatives, terphenyls, styrylketones, as well as 3-(aroylmethylene)-thiazolines, camphorquinone, and also eosin, rhodamine and erythrosine dyes.

The amines mentioned above, for example, can also be considered as photosensitisers. Further examples of such photosensitisers are 1. Thioxanthones Thioxanthone, 2-isopropylthioxanthone, 3-isopropylthioxanthone, 2-chlorothioxanthone, 2-dodecylthioxanthone, 1-chloro-4-propoxythioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride;

2. Benzophenones

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)-benzophenone, 3,3'-dimethyl-4-methoxybenzophenone, methyl 2-benzoylbenzoate, 4-(2-hydroxyethylthio)-benzophenone, 4-(4-tolylthio)-benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)-benzophenone, 4-benzoyl-N,N-dimethyl-N-[2-(1-oxo-2-propenyl)oxy]ethyl-benzenemethanaminium chloride, 2,4,6-trimethyl-4'-phenyl-benzophenone, 3-methyl-4'-phenyl-benzophenone;

3. 3-Acylcoumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonyl-bis[5,7-di(propoxy)coumarin], 3,3'-carbonyl-bis(7-methoxycoumarin), 3,3'-carbonyl-bis(7-diethylaminocomarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-dimethoxy-3-(1-naphthoyl)- coumarin, 3-benzoylbenzo[f]coumarin, 7-diethylamino-3-thienoylcoumarin, 3-(4-cyanobenzoyl)-5,7-dimethoxycoumarin;

4. 3-(Aroylmethylene)-thiazolines

3-Methyl-2-benzoylmethylene-β-naphthothiazoline, 3-methyl-2-benzoylmethylene-benzothiazoline, 3-ethyl-2-propionylmethylene-β-naphthothiazoline;

5. Other Carbonyl Compounds

Acetophenone, 3-methoxyacetophenone, 4-phenylacetophenone, benzil, 2-acetylnaphthalene, 2-naphthaldehyde, 9,10-anthraquinone, 9-fluorenone, dibenzosuberone, xanthone, 2,5-bis(4-diethylaminobenzylidene)cyclopentanone, α-(para-dimethylarninobenzylidene)-ketones, such as 2-(4-dimethylamino-benzylidene)-indan-1-one or 3-(4-dimethylaminophenyl)-1-indan-5-yl-propenone, 3-phenylthiophthalimide, N-methyl-3,5-di(ethylthio)phthalimide.

The proportion of sensitisers (f) in the formulations according to the invention is, for example, from 0.01 to 10% by weight, for example from 0.05 to 5% by weight, especially from 0.1 to 5% by weight.

The formulations may also comprise dyes and/or white or coloured pigments (g). Inorganic or organic pigments may be used, according to the intended use. Such additives are known to the person skilled in the art, some examples being titanium dioxide pigments, e.g. of the rutile or anatase type, carbon black, zinc oxide, such as zinc white, iron oxides, such as iron oxide yellow, iron oxide red, chromium yellow, chromium green, nickel titanium yellow, ultramarine blue, cobalt blue, bismuth vanadate, cadmium yellow and cadmium red. Examples of organic pigments are mono- or bis-azo pigments, and also metal complexes thereof, phthalocyanine pigments, polycyclic pigments, for example perylene, anthraquinone, thioindigo, quinacridone or triphenylmethane pigments, and also diketo-pyrrolo-pyrrole, isoindolinone, e.g. tetrachloroisoindolinone, isoindoline, dioxazine, benzimidazolone and quinophthalone pigments.

The pigments can be used in the formulations individually or in admixture.

Depending upon the intended use, the pigments are added to the formulations in the amounts customary in the art, for example in an amount of from 0.1 to 60% by weight, from 0.1 to 30% by weight or from 10 to 30% by weight, based on the total mass.

The formulations may also, for example, comprise organic dyes of an extremely wide variety of classes. Examples are azo dyes, methine dyes, anthraquinone dyes and metal complex dyes. Customary concentrations are, for example, from 0.1 to 20%, especially from 1 to 5%, based on the total mass.

Depending upon the formulation used, it is also possible to use as stabilisers compounds that neutralise acids, especially amines. Suitable systems are described, for example, in JP-A 11-199610. Examples are pyridine and derivatives thereof, N-alkyl- or N,N-dialkylanilines, pyrazine derivatives, pyrrole derivatives etc.

The invention relates also to a method as described above wherein the composition comprises, in addition to the photolatent component (d), other additives (h), sensitiser compounds (f) or/and dyes or pigments (g).

The invention relates also to a method as described in claim 1 wherein the composition comprises as further additive (e) at least one light stabiliser or/and at least one UV absorber compound.

The compositions used in the method according to the invention can be used for a variety of coating purposes, for example as a printing ink, such as a screen-printing ink, flexographic printing ink or offset printing ink, as a clearcoat, as a colorcoat, as a whitecoat, as a powder coating or as a paint, especially for metal or plastics.

Of special interest is the use of compositions in the preparation of decorative paints for a wide variety of substrates, especially metal, e.g. for coatings on vehicles, for example motor cars, or vehicle components, for example motor car components, railway components or aircraft components. Further examples are bicylce frames, motorbike frames, motorbike tanks etc. The compositions can likewise be used in automotive primary finishes and repair finishes and for finishing motor car bodywork, plastics components for motor cars and motor car accessories. The process according to the invention is also suitable for coating furniture, in particular plastic furniture. The compositions in the method according to the invention can also be used, for example, in a multi-layer structure in a filler, a basecoat or a clearcoat. Use in pigmented topcoats is also possible.

The compositions to be cured by the method according to the invention are preferably surface coatings.

A surface coating or paint is a liquid, paste-form or powder-form pigmented coating material which, when applied to a substrate, yields an opaque coating having protective, decorative or/and specific technical properties. An unpigmented coating is termed a clearcoat. In the context of the present Application, the term “coating” includes both pigmented and unpigmented coating materials. Depending upon the nature of the organic binder, coatings may comprise solvent and/or water or may be solventless or water-free. They may also comprise fillers and other additives in addition to the pigments. Powder coatings are solventless. Any kinds of coating are suitable as coatings in the method according to the invention, for example powder coatings, high-solids coatings, effect coatings, high-gloss coatings, silk-finish coatings, matt-finish coatings, spray coatings, dip-coatings, pour-coatings etc. Corresponding raw materials and compositions are known to the person skilled in the art and are described, for example, in “Lehrbuch der Lacktechnologie”, Vincentz Verlag, 1998.

Suitable light stabilisers for coatings are, for example, those mentioned above. Examples are also described in “Lichtschutzmittel für Lacke”, Vincentz Verlag, 1996.

In coatings, use is frequently made of mixtures of a prepolymer with poly-unsaturated monomers that also contain a mono-unsaturated monomer. The prepolymer is an especially important factor in respect of the properties of the coating film, and by varying the prepolymer the person skilled in the art can influence the properties of the cured film. The poly-unsaturated monomer acts as crosslinking agent, which renders the coating film insoluble. The mono-unsaturated monomer acts as reactive diluent, which assists in reducing viscosity without the need to use a solvent.

Unsaturated polyester resins are used mostly in two-component systems together with a mono-unsaturated monomer, preferably with styrene.

The method according to the invention can also be used, for example, for curing radiation-curable powder coating formulations. The powder coatings can be based, for example, on solid resins and monomers containing reactive double bonds, for example maleates, vinyl ethers, acrylates, acrylamides and mixtures thereof. A free-radical-UV-curable powder coating can be formulated by mixing unsaturated polyester resins with solid acrylamides (e.g. methacrylamidoglycolate methyl ester) and a free-radical photoinitiator, as described, for example, in the presentation “Radiation Curing of Powder Coating”, Conference Proceedings, Radtech Europe 1993 by M. Wittig and Th. Gohmann. Free-radical-UV-curable powder coatings can likewise be formulated by mixing unsaturated polyester resins with solid acrylates, methacrylates or vinyl ethers and a photoinitiator (or photoinitiator mixture). The powder coatings may also comprise binders, such as are described e.g. in DE 4 228 514 and EP 636 669. The UV-curable powder coatings can also comprise white or coloured pigments. For example, rutile titanium dioxide, especially, can be used in concentrations of up to about 50% by weight in order to obtain a cured powder coating having good hiding power. The method normally comprises spraying the powder electrostatically or tribostatically onto the substrate, for example metal or wood, melting the powder by heating and, after a smooth film has been formed, radiation-curing the coating. A particular advantage of radiation-curable powder coatings over corresponding thermally curable powder coatings is that the flow time after the powder particles have melted can be prolonged as desired in order to ensure the formation of a smooth high-gloss coating. Unlike thermally curable systems, radiation-curable powder coatings can be so formulated that they melt at relatively low temperatures without the undesirable effect of their useful life being shortened. For that reason they are also suitable as coatings for heat-sensitive substrates, for example wood or plastics.

In addition to the photoinitiators, the powder coating formulations may also comprise UV absorbers. Appropriate examples are listed above under points 1 to 8.

In the method according to the invention it is also possible, for example, for combinations of thermally curable and UV-curable powder coatings to be used and cured by the application of different plasmas using different plasma gases.

The method according to the invention can likewise be used in the curing of composite materials or in the production of printing plates.

The method according to the invention is also of interest in the curing of mouldings made of composite materials. The composite material consists of a self-supporting matrix material, for example woven glass fibers, or alternatively, for example, plant fibers [see K.-P. Mieck, T. Reussmann in Kunststoffe 85 (1995), 366-370], which is impregnated with the photocuring formulation. Mouldings of composite materials so produced achieve a high degree of mechanical stability and resistance. It is also possible to cure, for example, moulding, impregnating and coating materials, such as are described e.g. in EP 7086. Such materials are, for example, thin-layer resins, on which high demands are made in terms of curing activity and resistance to yellowing, and fiber-reinforced moulding materials, such as planar or longitudinally or transversely corrugated light panels. Articles produced from such resins are, for example: boats; chipboard or plywood panels coated on both sides with glass-fiber-reinforced plastics; pipes; sports equipment; roof coverings; containers etc. Further examples of moulding, impregnating and coating materials are UP resin thin layers for glass-fiber-containing moulding materials (GRP), for example corrugated panels. The thin layer is produced on a support (for example a film) prior to production of the laminate. The photocurable compositions can also be used for casting-resins or for the potting of articles, for example electronic components etc. A further advantage is that the composite material can be removed from the plasma in a partially cured, plastic state and subjected to shaping, after which the full cure is effected.

The process according to the invention can also be employed for curing of coil coats. A coil coat is a thin band of metal, or a polymer foil, that is coated with the wanted coating, e.g. a laquer. After coating the substrate, i.e. the metal foil, curing is effected by the process according to the invention. The coil coat can then, for example, be applied to a automotive part e.g. by deep-drawing. Such caotings are for example described in the following publications of 7. Automotive Circle International Conference, 12./13.03.2003 in Frankfurt, tci-Technik&Kommunikations Verlags GmbH, Berlin: A-Schnell, Lackierprozesse mit Coil Coating Stählen [Coating processes with coil coat steels]; Dr. P. Schubach, Innovative Korrosionsschutzkonzepte mit bandbeschichtetem Material [Innovative concepts for corrosion inhibition with coil coat material]; Dr. V. Berger, Verkürzte Automobillackierkonzepte auf Basis von vorlackierten Substraten [Shortened concepts for varnishing automobiles based on pre-laquered substrates]; Dr. I Rogner, Vorgefülltes Stahifeinblech—der nächste Schritt zum Einsatz bandlackierter Karrosseriebleche [Prefilled fine steel—the next step for employing coil coated car bodies].

The invention relates also to a method of producing mouldings from composite materials, wherein a support is impregnated with a composition comprising (a) at least one free-radical-polymerisable compound or
(b) at least one compound that, under the action of an acid, is able to enter into a polymerisation, polycondensation or polyaddition reaction, or
(c) at least one compound that, under the action of a base, is able to enter into a polymerisation, polycondensation or polyaddition reaction, or
a mixture of components (a) and (b), or
a mixture of components (a) and (c); and
(d) at least one photolatent compound that is activatable by plasma discharge;
and is introduced into a mould;
wherein the curing is carried out in a plasma discharge chamber and, optionally, thermal aftertreatment is carried out.

The method according to the invention can be used, for example, in the curing of coatings of glass fiber optical conductors (optical fibers).

Also of interest are the methods according to the invention wherein the composition is a printing ink.

Such printing inks are known to the person skilled in the art, are widely used in the art and are described in the literature. They are, for example, pigmented printing inks and printing inks coloured with dyes.

A printing ink is, for example, a liquid or paste-form dispersion that comprises colorants (pigments or dyes), binders and optionally solvents and/or optionally water and additives. Suitable pigments and dyes are generally known and widely described in the art, as are the printing ink formulations customary in the art.

In the method of the invention suitable printing inks are both solvent-based systems and water-based or solventless systems, for example radiation-curable systems.

The printing inks may also comprise, for example, alkyd systems that dry oxidatively.

A suitable aqueous printing ink composition comprises e.g. a pigment or combination of pigments, a dispersant and a binder. Suitable dispersants include, for example, the customary dispersants known to the person skilled in the art.

The printing ink compositions may also comprise as additional component e.g. an agent having a water-retaining action (humectant), preservatives, antioxidants, degassing agents/antifoams, agents for regulating the viscosity, flow improvers, anti-settling agents, gloss improvers, glidants, adhesion promoters, anti-skin agents, matting agents, emulsifiers, stabilisers, hydrophobic agents, light protection additives, solubilisers, thickeners, buffers, foam-suppressants, substances that inhibit the growth of fungi and/or bacteria, handle improvers and antistatics.

Suitable substrates for the application of the compositions to be cured are, for example, inorganic and organic substrates of all kinds, such as e.g. wood, textiles, paper, ceramics, glass, plastics, such as polyesters, polyethylene terephthalate, polyolefins or cellulose acetate, especially in the form of films, and also metals, such as Al, Cu, Ni, Fe, Zn, Mg and Co, and metal alloys, and GaAs, Si or $SiO_2$, to which e.g. a protective layer is to be applied.

Metal and plastics, especially metal, are preferred.

In the process according to the invention the substrate to be coated preferably is not glass. The surface to be coated may likewise be a basecoat, that is to say the substrate is coated with a basecoat, to which the formulation to be cured in accordance with the method of the invention is applied.

It is also possible to apply a plurality of layers, for example a filler, a colouring basecoat and a clearcoat, and to cure all the coatings together by means of the method of the invention.

The inorganic or organic substrate to be treated can be in any solid form. The substrate is preferably in the form of a powder, a fiber, a film or, especially preferred, a three-dimensional workpiece.

The method according to the invention is suitable especially for the curing of coatings on three-dimensional substrates, more especially those of which the geometry does not allow uniform irradiation by means of UV lamps. In contrast to conventional curing by irradiation with lamps, when curing is carried out using the method according to the invention the coatings are adequately cured even in overshadowed areas of such geometries.

The inorganic or organic substrate is preferably a thermoplastic, elastomeric, inherently crosslinked or crosslinked polymer, a metal oxide or a metal.

Examples of thermoplastic, elastomeric, inherently crosslinked or crosslinked polymers are listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE). Polyolefins, that is to say polymers of mono-olefins, as mentioned by way of example in the preceding paragraph, especially polyethylene and polypropylene, can be prepared by various processes, especially by the following methods:

a) by free-radical polymerisation (usually at high pressure and high temperature);

b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups. Such catalyst systems are usually referred to as Phillips, Standard Oil Indiana, Ziegler (-Natta), TNZ (DuPont), metallocene or Single Site Catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/-alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/-styrene.

7. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxyl terminal groups; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde, urea-formaldehyde and melamine-formaldehyde resins.

22. Drying and non-drying alkyd resins.

23. Unsaturated polyester resins derived from copolyesters of saturated and unsaturated dicarboxylic acids with polyhydric alcohols, and from vinyl compounds as crosslinking agents, and also the halogen-containing, difficultly combustible modifications thereof.

24. Crosslinkable acrylic resins derived from substituted acrylic acid esters, e.g. from epoxy acrylates, urethane acrylates or polyester acrylates.

25. Alkyd resins, polyester resins and acrylate resins that are crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of bisphenol A diglycidyl ethers, bisphenol F diglycidyl ethers, that are crosslinked using customary hardeners, e.g. anhydrides or amines with or without accelerators.

27. Natural polymers, such as cellulose, natural rubber, gelatin, or polymerhomologously chemically modified derivatives thereof, such as cellulose acetates, propionates and butyrates, and the cellulose ethers, such as methyl cellulose; and also colophonium resins and derivatives.

28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Within the context of the present invention, paper is also to be understood as being an inherently crosslinked polymer, especially in cardboard form, which can additionally be coated with e.g. Teflon®. Such substrates are, for example, commercially available.

The thermoplastic, crosslinked or inherently crosslinked plastics is preferably a polyolefin, polyamide, polyacrylate, polycarbonate, polystyrene or an acrylic/melamine, alkyd or polyurethane coating.

Special preference is given to polycarbonate, polyethylene, polypropylene, polyamide and polyimide. The plastics can be in the form of films, injection-moulded articles, extruded workpieces, fibers, felts or woven materials.

Inorganic substrates that come into consideration are especially metal oxides and metals, especially metals. They may be silicates and semi-metals or metal oxides, which are preferably in the form of powders having average particle diameters of from 10 nm to 2000 μm. They may be compact or porous particles. Examples of oxides and silicates are $SiO_2$, $TiO_2$, $ZrO_2$, MgO, NiO, $WO_3$, $Al_2O_3$, $La_2O_3$, silica gels, clays and zeolites. Preferred inorganic substrates, in addition to the metals, are silica gels, aluminium oxide, titanium oxide and mixtures thereof.

The substrates can be coated by applying a liquid composition, a solution or a suspension to the substrate. The choice of solvent and its concentration are governed chiefly by the nature of the composition and the coating method. The solvent should be inert, that is to say it should not enter into any chemical reaction with the components, and it should be capable of being removed again on drying after the coating operation. Suitable solvents include, for example, ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

The formulation is applied uniformly to a substrate by means of known coating methods, for example by spin-coating, dipping, knife coating, curtain pouring, brush application or spraying, especially e.g. by electrostatic spraying and reverse-roll coating, and also by electrophoretic deposition. It is also possible to apply the photosensitive layer to a temporary flexible support and then coat the final substrate by transferring the layer via lamination.

The amount applied (layer thickness) is dependent upon the desired field of application. The person skilled in the art will be familiar with the layer thicknesses suitable for the field of application in question, for example in the field of printing inks or paints. The range of layer thicknesses generally includes values of about from 1 to 100 μm, e.g. from 5 to 80 μm, especially from 10 to 60 μm, depending upon the field of application.

The method according to the invention is of special interest for metal coating, for example in the coating of sheets and tubes, cans or bottle closures, vehicle components or entire vehicles, especially motor cars.

The invention relates to a coating obtainable by the method described above.

Possible ways of obtaining plasmas under vacuum conditions have been described frequently in the literature. The electrical energy can be coupled in by inductive or capacitive means. It may be direct current or alternating current; the frequency of the alternating current may vary from a few kHz up into the MHz range. A power supply in the microwave range (GHz) is also possible.

The generation of low-temperature plasmas is known and is described, for example, by A. T. Bell, “Fundamentals of Plasma Chemistry” in “Technology and Application of Plasma Chemistry”, edited by J. R. Holahan and A. T. Bell, Wiley, New York (1974) or by H. Suhr, Plasma Chem. Plasma Process 3(1), 1, (1983).

As primary plasma gases it is possible to use, for example, $N_2$, He, Ar, Ne, Kr or Xe singly or in admixture. In addition, it is also possible, for example, to add metals and metal halides for doping purposes.

Preferably $N_2$, He and Ar are employed, as well as mixtures of $N_2$ and He, or $N_2$ and Ar. Further, mixtures of more than two gases can be used. It is also possible to first introduce one specific gas and introduce another one lateron. For example, first Ar is employed and after the activation of the plasma mixed with $N_2$.

The curing chamber is advantageously a chamber, for example of steel, that is provided with a plurality of inlets and outlets in order that both the generation of a vacuum and the introduction of the gas or gases, respectively, required to generate the plasma can be effected. The chamber is equipped with a magnetic device or suitable electrodes with the aid of which the excitation of a plasma is effected. Suitable apparatus is known in the art and is commercially available (for example from Roth & Rau Oberflächentechnik A G, Germany). The chamber may have further inlets and outlets, for example to allow irradiation with IR lamps. The more, the chamber can be provided with metallized (e.g. with aluminium) walls. The chamber is configured especially for the treatment of three-dimensional workpieces, and the coupling-in of microwaves can be matched to the respective actual geometries of the substrate to be coated. The coated substrate can also for example be brought into (conductive) contact with the chamber or can be inserted with an isolation. Further a potential could be applied to influence the conductivity in the chamber.

The pressure can be controlled by the gas inlet, further by special shutters that are part of the chamber.

The coating is cured by the plasma generated in the chamber. For that purpose, inter alia the wavelength spectrum generated (emitted) by the plasma discharge of the particular gas or gas mixture used comes into effect. Such wavelengths are, for example, wavelengths of from 50 to 850 nm, for example from 50 to 700 nm, preferably from 150 to 700 nm, especially from 200 to 600 nm.

Treatment in the plasma chamber can optionally be followed by a thermal step. It is also possible to subject the coated substrate to a thermal treatment prior to treatment in the plasma chamber, as well as to carry out both thermal pretreatment and thermal after-treatment. Simultaneous plasma treatment and heat treatment of the coating being cured is also a possibility. The thermal treatment is carried out, for example, by convection (circulating air drying) and/or especially by irradiation with IR lamps. Further, the heat treatment can, for example, be carried out using microwave irradiation. The temperatures are generally governed by the particular binder system used and are, for example, from room temperature to 150° C., e.g. from 25 to 150° C. or from 50 to 150° C. In the case of powder coatings the temperatures can also be higher, for example up to 250° C.

The curing of coatings by means of plasma has a decisive advantage over conventional curing using ultraviolet radiators. When an irregularly shaped three-dimensional article is cured in the plasma chamber, all areas are reached by the radiation energy, whereas in the case of irradiation with light any overshadowed areas are irradiated inadequately or are not irradiated at all and therefore undergo irregular curing. For example, the method according to the invention can thus also be used, for example, for the curing of large coated areas, for example the entire bodywork of a vehicle.

The following Examples illustrate the invention further. As in the remainder of the description and in the patent claims, parts or percentages relate to weight unless otherwise indicated. Where reference is made to alkyl or alkoxy radicals having more than three carbon atoms without any indication of their isomeric form, the respective n-isomers are intended.

The following Examples are carried out in a plasma chamber having a volume of about 50 litres. The chamber is equipped with a microwave antenna and gas lances for the introduction of process gases. The chamber can be evacuated to pressures of about $10^{-4}$ mbar by means of a two-stage pump system. The variable process parameters are in each case the gases used ($N_2$, He, Ar, Ne . . . ) and the ratio of mixtures thereof. Other variable process parameters are the processing time, the microwave power supplied and the process pressure in the chamber as a function of the volumetric flow of gas supplied [sccm] and the power of the evacuation. The position of the coated substrate in the chamber relative to the microwave antenna is also of significance.

EXAMPLE 1

A radiation-curable formulation is prepared by mixing together the following components:

89.0 parts 75% epoxy acrylate in hexanediol diacrylate (®Ebecryl 604; UCB, Belgium)

10.0 parts polyethylene glycol 400 diacrylate (®Sartomer SR 344; Sartomer)

1.0 part silicone diacrylate (®Ebecryl 350, UCB, Belgium)

2.0 parts phenyl 1-hydroxycyclohexyl-ketone (®Irgacure 184, Ciba Spezialitätenchemie, Switzerland)

In a vacuum apparatus having a volume of about 50 litres and equipped with an ECR plasma source RR 2509 (Roth & Rau Oberflächentechnik A G, Germany), an angled aluminium sheet which has been coated with the formulation described above is installed on a substrate holder.

After the receptacle of the apparatus has been evacuated to a base pressure of about $10^{-5}$ mbar, (depending upon the nature of the plasma excitation) argon or nitrogen is admitted into the receptacle by way of a mass flow controller up to a working pressure region of 0.01 mbar for a microwave plasma or of about 0.003 mbar for an ECR plasma and the plasma is ignited. For generating the plasmas, a power of about 400 to 600 Watt is supplied. After an exposure time of 90 seconds, the plasma treatment is discontinued and air is admitted to the receptacle. The coated sheet is removed. The coating layer applied is cured.

EXAMPLE 2

In a vacuum apparatus having a volume of about 50 litres and equipped with a HF parallel plate plasma arrangement, an angled aluminium sheet coated with the formulation according to Example 1 is installed on the lower plate of the arrangement which is configured as a substrate holder. After the receptacle of the apparatus has been evacuated to a base pressure of about $10^{-5}$ mbar, argon or nitrogen is admitted into the receptacle by way of a mass flow controller up to a working pressure region of 0.01 mbar and the gas discharge is generated and the HF plasma ignited by applying a voltage across a parallel plate electrode system consisting of the substrate support itself and a counter-electrode. For generating the plasma, a power of about 10 to 200 Watt is supplied. After an exposure time of 90 seconds, the plasma treatment is discontinued and air is admitted to the receptacle. The coated sheet is removed. The coating layer applied is cured.

EXAMPLE 3

The following radiation-curable formulation is applied as described in Example 1 and cured in the plasma:

60.0 parts bisphenol A epoxy resin (®Araldit GY 250, Vantico), 24.0 parts trimethylolpropane triglycidyl ether (®Grinolit V51-31, Emschemie), 16.0 parts $C_{12/14}$alkyl glycidyl ether (®Grinolit Epoxid 8, Emschemie)

The formulation is heated to 50° C. and uniformly mixed by stirring for 20 minutes in the presence of glass beads as aid. 1.5% (4-isobutylphenyl)-ptolyl-iodonium hexafluorophosphate is added and dissolved in the formulation by stirring.

EXAMPLE 4

The following radiation-curable formulation is applied as described in Example 1 and cured in the plasma:

40.9 parts Araldite® CY 179 (cycloaliphatic diepoxide, Vantico)

5.0 parts Tones 0301 (polycaprolactonetriol, chain-transfer reagent, UCC)

2.0 parts dipropylene glycol 1.5% 4-octyloxyphenylphenyliodonium hexafluoroantimonate is incorporated into this formulation.

EXAMPLE 5

1.3 parts by weight of the urethane acrylate described below (5.1) are mixed with 1 part by weight of the malonate ester described below (5.2). 2.5% of the photolatent base

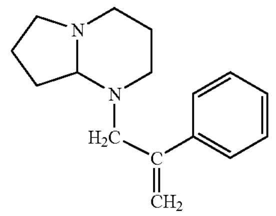

and 0.5% QuantacureϕITX are added to the resulting resin mixture.

5.1 Preparation of the urethane acrylate on the basis of isophorone diisocyanate and 4-hydroxybutyl acrylate.

The reaction is carried out under a nitrogen atmosphere; all commercial chemicals used are used without further purification.

1566.8 g (13.78 mol of NCO) of isophorone diisocyanate, 2.3 g of dibutyltin dilaurate, 2.3 g of 2,5-di-tert-butyl-p-cresol and 802.8 g of butyl acetate are introduced into a three-necked flask having a condenser and dropwise addition device. Dry nitrogen is bubbled through the reaction mixture and the temperature is slowly raised to 60° C. 1987 g (13.78 mol) of 4-hydroxybutyl acrylate are added, the temperature of the reaction solution slowly rising to 80° C. The temperature is maintained at 80° C. and the dropwise addition device is rinsed with butyl acetate (86.6 g). The reaction is monitored by titration of the residual isocyanate and is terminated when the isocyanate content is less than 0.2%, based on the solid. A reaction product having the following physical properties is obtained:

residue: 4-hydroxybutyl acrylate: <0.002% based on the solid (HPLC analysis), colour: <<Gardner 1, viscosity: 43 cPa s (20° C.), solid: 79.3% (1 hour at 140° C.), GPC data (polystyrene standard), $M_n$778, $M_w$796, d=1.02.

5.2 Preparation of the malonate polyester

The reaction is carried out under a nitrogen atmosphere; all commercial chemicals used are used without further purification.

In a reaction vessel having a stirrer and a condenser, 1045 g of 1,5-pentanediol, 1377.4 g of diethyl malonate and 242.1 g of xylene are cautiously heated at reflux. The maximum temperature of the reaction mixture is 196° C. whereas the temperature at the condenser head is maintained at 79° C. 862 g of ethanol, corresponding to a conversion of 97.7%, are distilled off in that manner. Xylene is then removed in vacuo at a temperature of 200° C. The resulting polymer has a solids content of 98.6%, a viscosity of 2710 mmPa s and an acid number of 0.3 mg of KOH/g, based on the solid. $M_n$ is 1838, $M_w$ is 3186, the colour is 175 on the APHA scale (method of the American Public Health Association; "Hazen colour number"; ISO 6271).

The coating is applied to angled coil-coat aluminium so that a dry layer thickness of 30 μm is obtained. The coating is flashed off for 5 minutes at room temperature and then cured in the plasma chamber. The curing is carried out under a $N_2$/Ar atmosphere having a gas amount ratio of 160/40 sccm; the microwave power corresponds to 800 W for 90 s. The distance between the sample and the microwave antenna is 150 mm. A well cured, tack-free coating is obtained.

EXAMPLE 6

A powder coating formulation is prepared by mixing together the following components:

579.2 parts of an amorphous resin, containing methacrylic and acrylic double bonds (Uvecoat 3000, UCB Chemicals)

58.8 parts of a flow improver (Resiflow PV 5, Woerlee)

29.4 parts of a degassing agent (Woerlee Add 902, Woerlee)

12.0 parts 2-hydroxy-1-[4-(2-hydroxyethoxy)phenyl]-2-methyl-1-propanone as photo-initiator (Irgacure 2959, Ciba Spezialitätenchemie)

After extrusion and grinding, the powder coating is applied by spray-application to angled coil-coat aluminium sheets. Melting is carried out in a circulating air oven for 5 minutes at 150° C. Curing is effected in the plasma chamber under a $N_2$/Ar atmosphere having a gas amount ratio of 160/40 sccm; the microwave power corresponds to 800 W for 90 s. The distance between the sample and the microwave antenna is 150 mm. A well cured, tack-free coating is obtained. The degree of final cure is determined with the aid of König pendulum hardness (DIN 53157). The higher the pendulum hardness value, the harder is the coating. The cured powder coating has a pendulum hardness of 180 s.

EXAMPLE 7

A photocurable formulation is prepared by mixing together the following components:

44.5 parts of an aliphatic urethane acrylate (Ebecryl 284; 88 parts aliphatic urethane acrylate/12 parts hexanediol diacrylate; Bayer A G)

32.2 parts of an aliphatic urethane tri/tetra-acrylate (Roskydal U A VP LS 2308; Bayer A G)

50.0 parts isopropanol 1.5 parts of a flow improver (Byk 306; Byk Chemie)

2.7% 1-hydroxy-cyclohexyl-phenylketone (Irgacure 184, Ciba Spezialitätenchemie), 0.5% bis(2,4,6-trimethylbenzoyl) phenylphosphine oxide (Irgacure 819, Ciba Spezialitätenchemie), 1.5% Tinuvin 400 (=mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine, Ciba Spezialitätenchemie) and 1% Tinuvin 292 (=mixture of bis(1,2,2,6,6-pentamethyl-4-piperidinyl) sebacate and 1-(methyl)-8-(1,2,2,6,6-pentamethyl-4-piperidinyl) sebacate, Ciba Spezialitätenchemie) (based on solid) are added to the formulation given in the Table and stirred at 40° C. on a water bath. A coil-coat aluminium is formed into an upside down U shape. The coating is applied with the aid of spray-application so that a resulting dry layer thickness of 30 μm is obtained. The coating on the three-dimensional substrate is flashed off for 5 minutes at room temperature, then for 10 minutes at 80° C. in a circulating air oven and is then cured in the plasma chamber. Curing is carried out under a $N_2$/He atmosphere having a gas amount ratio of 135/65 sccm; the microwave power corresponds to 500 W for 90 s. The distance between the sample and the microwave antenna is 150 mm. A well cured, tack-free coating is obtained. The degree of full-cure is determined with the aid of König pendulum hardness (DIN 53157). The higher the pendulum hardness value, the harder is the coating. The left-hand side of the U-shaped sheet has a pendulum hardness of 67 s, the right-hand side a pendulum hardness of 91 s. The upper side of the U-shaped sheet achieves a pendulum hardness of 126 s.

EXAMPLE 8

Components A and B are prepared by mixing together the following constituents:

Component A 11.38 parts of a hydroxyl-group-containing polyacrylate; 70% in butyl acetate (Desmophen A 870, Bayer A G)

21.23 parts polyester polyol, 75% in butyl acetate (Desmophen VP LS 2089, Bayer A G)

0.55 part of a flow improver (Byk 306, Byk Chemie)

32.03 parts methanol

The following photoinitiators and light stabilisers are stirred into component A:

0.17 part bis(2,4,6-trimethylbenzoyl) phenylphosphine oxide (Irgacure 819, Ciba Spezialitätenchemie)

1.52 parts 1-hydroxy-cyclohexyl-phenylketone (Irgacure 184, Ciba Spezialitätenchemie)

0.85 part Tinuvin 400 (=mixture of 2-[4-[(2-hydroxy-3-dodecyloxypropyl)oxy]-2-hydroxy-phenyl]-4,6-bis(2,4-dimethylphenyl)-1,3,5-triazine and 2-[4-[(2-hydroxy-3-tri-decyloxypropyl)oxy]-2-hydroxyphenyl]-4,6-bis(2,4-dimethylphenyl)-1,3,5-triazine, Ciba Spezialitätenchemie)

0.56 part Tinuvin 292 (=mixture of bis(1,2,2,6,6-pentamethyl-4-piperidinyl) sebacate and 1-(methyl)-8-(1,2,2,6,6-pentamethyl-4-piperidinyl) sebacate, Ciba Spezialitätenchemie)

Then Component B 32.09 parts of an isocyanate-group-containing urethane acrylate (Roskydal U A VP LS 2337, Bayer A G) is added and homogeneously distributed.

The coating is applied with a 100 μm slotted knife to a planar coil-coat aluminium, so that a dry layer thickness of 30 μm is obtained. The coating is flashed off for 5 minutes at room temperature, then thermally crosslinked for 15 minutes at 120° C. in a circulating air oven and then cured in the plasma chamber. Curing is carried out under a $N_2$/Ar atmosphere having a gas amount ratio of 160/40 sccm; the microwave power corresponds to 800 W for 90 s. The distance between the sample and the microwave antenna is 150 mm. A well cured, tack-free coating is obtained. The degree of full-cure is determined with the aid of König pendulum hardness (DIN 53157). The higher the pendulum hardness value, the harder is the coating. A value of 118 s is obtained.

EXAMPLE 9

A photocurable formulation is prepared by mixing together the following components:

60.0 parts of a polyester acrylate (Ebecryl 830; UCB Chemicals Belgium)

15.0 parts hexanediol diacrylate (UCB Chemicals Belgium)

15.0 parts trimethylolpropane triacrylate (UCB Chemicals Belgium)

9.0 parts titanium dioxide (Kronos 2310, Kronos Chemicals)

1.0 part of a copper phthalocyanine (Irgalit Blau BSP, Ciba Specialty Chemicals)

3% Irgacure 2020 (=mixture of 20 parts bis(2,4,6-trimethylbenzoyl)-phenylphosphine oxide and 80 parts 1-benzoyl-1-hydroxy-1-methyl-ethane; Ciba Specialty Chemicals) are added to the resulting formulation as photoinitiator.

The coating is applied to angled coil-coat aluminium so that a dry layer thickness of 30 μm is obtained. The coating is flashed off for 5 minutes at room temperature and then cured in the plasma chamber. Curing is carried out under a $N_2$/Ar atmosphere having a gas amount ratio of 160/40 sccm; the microwave power corresponds to 800 W for 90 s. The distance between the sample and the microwave antenna is 150 mm. A well cured, tack-free coating is obtained.

EXAMPLE 10

A photocurable formulation is prepared by mixing together the following components:

98.5 parts of an amorphous resin having methacrylic and acrylic double bonds (Uvecoat 3000, UCB Chemicals)

1.0 part flow improver (Resiflow PV 5, Woerlee)

0.5 part degassing agent (Woerlee Add 902, Woerlee)

1.5 parts 2-hydroxy-1-[4-(2-hydroxyethoxy)phenyl]-2-methyl-1-propanone (Irgacure 2959, Ciba Specialty Chemicals)

1.5 parts bis(2,4,6-trimethylbenzoyl)-phenylphosphine oxide (Irgacure 819; Ciba Specialty Chemicals)

0.5 part carbon black (Spezialschwarz 250, Degussa)

After extrusion and grinding, the powder coating is applied by spray-application to angled coil-coat aluminium sheets. Melting is carried out in a circulating air oven for 5 minutes at 150° C. Curing is effected in the plasma chamber under a $N_2$/Ar atmosphere having a gas amount ratio of 160/40 sccm; the microwave power corresponds to 800 W for 90 s. The distance between the sample and the microwave antenna is 150 mm. A well cured, tack-free coating is obtained. The degree of final cure is determined with the aid of König pendulum hardness (DIN 53157). The higher the pendulum hardness value, the harder is the coating. A value of 195 s is obtained.

What is claimed is:

1. A method of curing a composition comprising applying the composition to a three-dimensional substrate and curing by plasma in a plasma discharge chamber wherein the composition comprises (d) and either (a), (b), (c), a mixture of (a) and (b), or a mixture of (a) and (c), wherein (a) is at least one free-radical-polymerisable compound, (b) is at least one compound that, under the action of an acid, is able to enter into a polymerisation, polycondensation or polyaddition reaction, (c) is at least one compound that, under the action of a base, is able to enter into a polymerisation, polycondensation or polyaddition reaction, and (d) is at least one photolatent compound that is activatable by plasma discharge selected from the group consisting of formula I, II and IV;

formula I being (I)

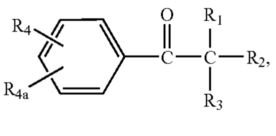

wherein $R_1$ is $C_1$-$C_{12}$alkyl or $C_1$-$C_{12}$alkoxy;

$R_2$ is $OR_5$ or $NR_7R_8$;

$R_3$ is $C_1$-$C_{12}$alkyl, $C_1$-$C_{12}$alkoxy, $C_3$-$C_{12}$alkenyl, phenyl-$C_1$-$C_6$alkyl or $C_1$-$C_6$alkylphenyl-$C_1$-$C_6$alkyl;

or $R_1$ and $R_3$, together with the carbon atom to which they are bonded, form a cyclohexyl ring;

$R_4$ and $R_{4a}$ are each independently of the other hydrogen, $C_1$-$C_{12}$alkyl, $C_1$-$C_{12}$hydroxyalkyl, $OR_5$, $SR_6$, $NR_7R_8$, halogen,

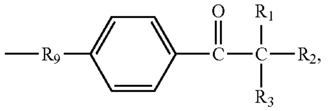

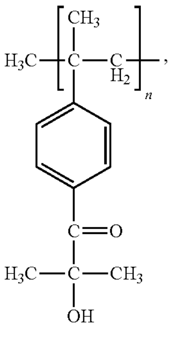

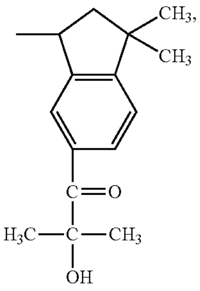

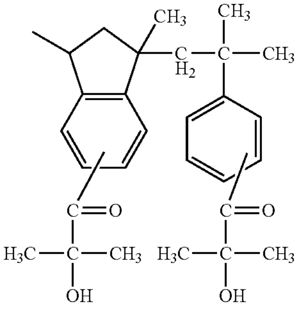 or or a monovalent linear or branched siloxane radical;

n is a number from 1 to 10;

$R_5$ is selected from the group consisting of hydrogen, $C_1$-$C_{12}$alkyl, $C_1$-$C_{12}$alkenyl, phenyl, benzyl, Si($CH_3$ and —$[C_aH_{2a}X]_b$—$R_{10}$, if and only if, $R_1$ and $R_3$, together with the carbon atom to which they are bonded, form a cyclohexyl ring; or $R_5$ is selected from the group consisting of $C_1$-$C_{12}$alkyl, $C_1$-$C_{12}$alkenyl, phenyl, benzyl, $Si(CH_3)_3$ or —$[C_aH_{2a}X]_b$—$R_{10}$, if and only if, $R_1$ and $R_3$, together with the carbon atom to which they are bonded, do not form a cyclohexyl ring;

$R_6$ is hydrogen, $C_1$-$C_{12}$alkyl, $C_1$-$C_{12}$alkenyl, phenyl, benzyl, $Si(CH_3)_3$ or —$[C_aH_{2a}X]_b$—$R_{10}$;

$R_7$ and $R_8$ are each independently of the other hydrogen, $C_1$-$C_{12}$alkyl, $C_2$-$C_5$hydroxyalkyl, or $R_7$ and $R_8$, together with the N atom to which they are bonded, form a 5- or 6-membered ring, which ring is either not further interrupted or is interrupted by one or more O atoms or a $NR_{11}$ group;

$R_9$ is a single bond, O, S, $NR_{11}$, —$CH_2CH_2$— or

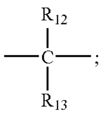

a and b are each independently of the other a number from 1 to 12;

X is S, O or $NR_{11}$;

$R_{10}$ is hydrogen, $C_1$-$C_{12}$alkyl or

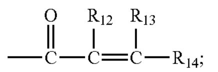

$R_{11}$ is hydrogen, phenyl, phenyl-$C_1$-$C_4$alkyl, $C_1$-$C_{12}$alkyl or $C_2$-$C_5$hydroxyalkyl; and $R_{12}$, $R_{13}$ and $R_{14}$ are each independently of the others hydrogen or methyl;

formula II being (II)

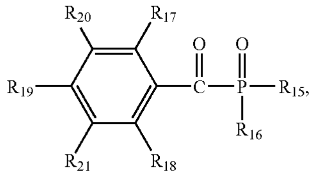

wherein $R_{15}$ and $R_{16}$ are each independently of the other $C_1$-$C_{12}$alkyl, $C_1$-$C_{12}$alkoxy, phenyl, phenyl substituted by one or more $OR_{22}$, $SR_{23}$, $NR_{24}R_{25}$, $C_1$-$C_{12}$alkyl or halogen substituents, biphenylyl, naphthyl, phenyl-$C_1$-$C_4$alkyl or

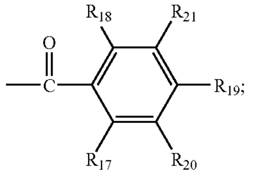

$R_{17}$ and $R_{18}$ are each independently of the other $C_1$-$C_{12}$alkyl, $C_1$-$C_{12}$alkoxy, $CF_3$ or halogen;

$R_{19}$, $R_{20}$ and $R_{21}$ are each independently of the others hydrogen, $C_1$-$C_{12}$alkyl, $C_1$-$C_{12}$alkoxy, $CF_3$ or halogen;

$R_{22}$ and $R_{23}$ are each independently of each other hydrogen, $C_1$-$C_{12}$alkyl, $C_2$-$C_{12}$alkenyl, $C_3$-$C_8$cycloalkyl, phenyl, benzyl, $C_2$-$C_{20}$alkyl which is interrupted by O atoms or $C_2$-$C_{20}$alkyl which is interrupted by O atoms and substituted by OH and/or SH;

$R_{24}$ and $R_{25}$ are each independently of each other hydrogen, $C_1$-$C_{12}$alkyl, $C_2$-$C_{12}$alkenyl, $C_3$-$C_8$cycloalkyl, phenyl, benzyl, $C_2$-$C_{20}$ alkyl which is interrupted by O atoms, $C_2$-$C_{20}$ alkyl which is interrupted by O atoms and substituted by OH and/or SH; or $R_{24}$ and $R_{25}$, together with the N atom to which they are bonded, form a 5- or 6-membered ring, which ring is uninterrupted or is interrupted by O, S or an $NR_{26}$ group; and $R_{26}$ is hydrogen, phenyl, phenyl-$C_1$-$C_4$alkyl, $C_1$-$C_{12}$alkoxy, $C_1$-$C_{12}$alkyl or $C_1$-$C_{12}$hydroxyalkyl;

and formula IV being (IV)

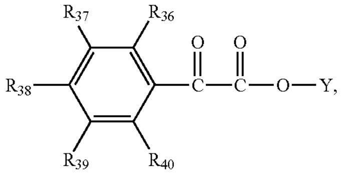

wherein $R_{36}$, $R_{37}$, $R_{38}$, $R_{39}$ and $R_{40}$ are each independently of the others hydrogen, halogen, $OR_{42}$, $SR_{43}$, $NR_{44}R_{45}$, $C_1$-$C_{12}$alkyl, $C_1$-$C_{12}$alkyl substituted by OH, $C_1$-$C_4$alkoxy, phenyl, naphthyl, halogen, CN and/or —$OCOR_{41}$, $C_2$-$C_{12}$alkyl which is interrupted by one or more O atoms, monovalent linear or branched siloxane radical, phenyl or phenyl substituted by one or two $C_1$-$C_4$alkyl and/or one or two $C_1$-$C_4$alkoxy substituents;

$R_{41}$ is $C_1$-$C_8$alkyl, phenyl or phenyl substituted by from one to three $C_1$-$C_4$alkyl and/or one to three $C_1$-$C_4$alkoxy substituents;

$R_{42}$ and $R_{43}$ are each independently of the other hydrogen, $C_1$-$C_{12}$alkyl, $C_1$-$C_{12}$alkyl substituted by OH, $C_1$-$C_4$alkoxy, phenyl, phenoxy and/or —$OCOR_{41}$, $C_2$-$C_{12}$alkyl which is interrupted by one or more O atoms, $C_3$-$C_6$alkenyl, cyclopentyl, cyclohexyl, naphthyl, phenyl or phenyl substituted by $C_1$-$C_4$alkoxy, phenyl and/or $C_1$-$C_4$alkyl;

$R_{44}$ and $R_{45}$ are each independently of the other hydrogen, $C_1$-$C_{12}$alkyl, $C_1$-$C_{12}$alkyl substituted by OH, $C_1$-$C_4$alkoxy and/or phenyl, $C_2$-$C_{12}$alkyl which is interrupted by one or more O atoms, phenyl, —$COR_{41}$, $SO_2R_{46}$, or $R_{44}$ and $R_{45}$, together with the nitrogen atom to which they are bonded, form a 5-, 6- or 7-membered ring, which ring is uninterrupted or interrupted by —O— or —$NR_{47}$—;

or the substituents $OR_{42}$, $SR_{43}$, and $NR_{44}R_{45}$ form a 5- or 6-membered by way of the radicals $R_{42}$, $R_{43}$, $R_{44}$ and/or $R_{45}$ with further substituents on the phenyl ring or with one of the carbon atoms of the phenyl ring;

$R_{46}$ is $C_1$-$C_{12}$alkyl, phenyl or 4-methylphenyl;

$R_{47}$ is hydrogen, $C_1$-$C_8$alkyl, $C_1$-$C_8$alkyl substituted by OH or $C_1$-$C_4$alkoxy, phenyl or phenyl substituted by OH, $C_1$-$C_4$alkyl or $C_1$-$C_4$alkoxy;

Y is

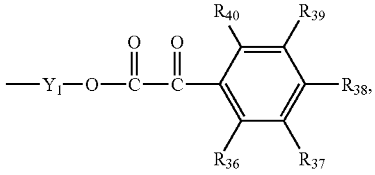

$C_1$-$C_{20}$alkyl, phenyl, naphthyl, phenyl-$C_1$-$C_4$alkyl or a monovalent linear or branched siloxane radical;

$Y_1$ is phenylene, $C_1$-$C_{12}$alkylene, $C_4$-$C_8$alkenylene, $C_4$-$C_8$alkynylene, cyclohexylene, $C_4$-$C_{40}$alkylene interrupted by one or more —O—, —S— or —$NR_{48}$—, a group

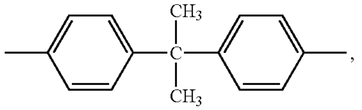

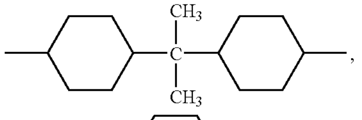

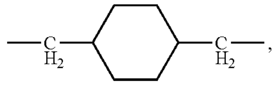

-continued

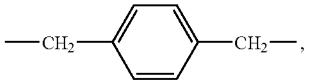

$—CH_2—$, $—CH_2CH(OH)CH_2O—Y_2—OCH_2CH(OH)CH_2—$, $—CH_2CH(OH)CH_2—$,

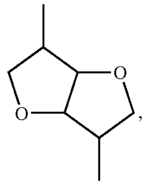

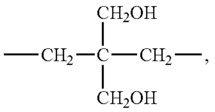

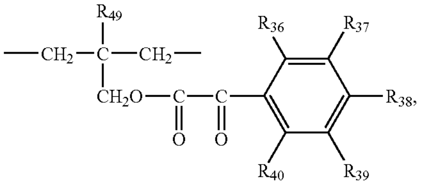

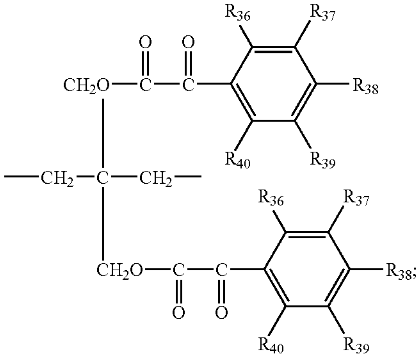

or a divalent linear or branched siloxane radical;

$Y_2$ is phenylene, $C_1$-$C_{12}$alkylene, $C_4$-$C_8$alkenylene, $C_4$-$C_8$alkynylene, cyclohexylene, $C_4$-$C_{40}$alkylene interrupted by one or more —O—, —S— or $—NR_{48}—$, a group

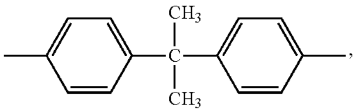

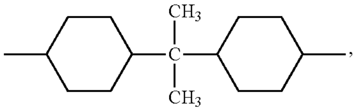

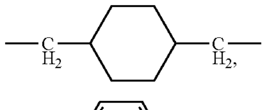

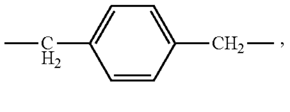

-continued

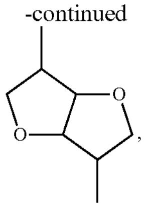

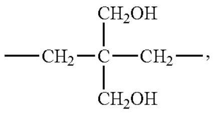

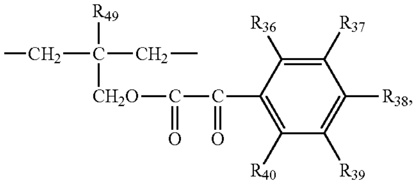

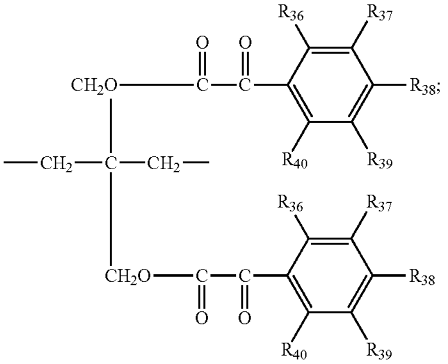

or a divalent linear or branched siloxane radical;

$R_{48}$ is hydrogen, $C_1$-$C_{12}$alkyl or phenyl; and $R_{49}$ is hydrogen, $CH_2OH$ or $C_1$-$C_4$alkyl.

2. A method according to claim 1, wherein component (d) in the composition is at least one compound selected from the group consisting of formula I and II.

3. The method according to claim 1, wherein the composition comprises, in addition to the photolatent component (d), other additives (h), sensitizer compounds (f) and/or dyes or pigments (g).

4. The method according to claim 3, wherein the composition comprises at least one light stabiliser or/and at least one UV absorber compound.

5. The method according to claim 1, wherein the composition is a surface coating.

6. The method according to claim 1, wherein the composition is a printing ink.

7. The method according to claim 1, wherein the composition comprises as polymerisable component solely free-radical-polymerisable compounds (a).

8. The method according to claim 7, wherein the free-radical-polymerisable compound comprises at least one compound selected from the group consisting of mono-, di-, tri- or tetra-functional acrylate monomers and mono-, di-, tri- or tetra-functional acrylate-functional oligomers.

9. The method according to claim 1, wherein the composition comprises as polymerisable component solely cationically polymerisable or crosslinkable compounds (b).

10. The method according to claim 1, wherein the composition comprises as polymerisable component a mixture of at least one free-radical-polymerisable compound (a) and at least one cationically polymerisable compound (b).

11. The method according to claim 1 of curing a composition wherein the composition comprises (a), (d) and either (a1), (a2) or a mixture of (a1) and (a2) wherein (a) is at least one free-radical-polymerisable component having at least one ethylenically unsaturated double bond, the free-radical-polymerisable component optionally additionally being functionalised with OH, $NH_2$, COOH, epoxy or NCO groups;

(a1) is a mixture of at least one compound selected from the group consisting of polyacrylates and polyester polyols, and at least one compound selected from the group consisting of melamine, melamine derivatives and blocked or non-blocked polyisocyanates;

(a2) is a mixture of at least one compound selected from the group consisting of carboxyl-, anhydride- or amino-functional polyesters and carboxyl-, anhydride- or amino-functional polyacrylates, and at least one compound selected from the group consisting of epoxy-functional polyesters and polyacrylates;

and (d) is at least one photolatent compound of that is activatable by plasma discharge selected from the group consisting of formula I, II, and IV;

wherein the curing of the composition is carried out in a plasma discharge chamber and, optionally, thermal pre- or after-treatment is carried out.

12. The method of curing a composition according to claim 1 for producing mouldings from composite materials, wherein a support is impregnated with the composition and introduced into a mould; wherein the curing is carried out in a plasma discharge chamber and, optionally, thermal after-treatment is carried out.

* * * * *